(12) United States Patent
Sugawara et al.

(10) Patent No.: US 11,655,175 B2
(45) Date of Patent: May 23, 2023

(54) SCREW TYPE SEPARATION DEVICE AND WASTEWATER TREATMENT SYSTEM

(71) Applicant: METAWATER CO., LTD., Tokyo (JP)

(72) Inventors: Yoshiyuki Sugawara, Tokyo (JP); Masafumi Tan, Tokyo (JP)

(73) Assignee: Metawater Co., Ltd., Tokyo (JP)

( * ) Notice: Subject to any disclaimer, the term of this patent is extended or adjusted under 35 U.S.C. 154(b) by 350 days.

(21) Appl. No.: 16/496,603

(22) PCT Filed: Nov. 9, 2017

(86) PCT No.: PCT/JP2017/040484
§ 371 (c)(1),
(2) Date: Sep. 23, 2019

(87) PCT Pub. No.: WO2018/179569
PCT Pub. Date: Oct. 4, 2018

(65) Prior Publication Data
US 2021/0087095 A1    Mar. 25, 2021

(30) Foreign Application Priority Data

Mar. 30, 2017   (JP) .............................. JP2017-069280

(51) Int. Cl.
C02F 11/125        (2019.01)
B01D 21/24         (2006.01)
(Continued)

(52) U.S. Cl.
CPC ........ *C02F 11/125* (2013.01); *B01D 21/2461* (2013.01); *B30B 9/166* (2013.01);
(Continued)

(58) Field of Classification Search
CPC ............ B30B 9/121; B30B 9/128; B30B 9/14; B30B 9/166; B30B 9/18; B01D 33/648; B01D 43/00; B04B 1/20; C02F 11/125
(Continued)

(56) References Cited

U.S. PATENT DOCUMENTS 4,266,473 A * 5/1981 Hunt ........................ B30B 9/12
                                                          100/117
4,457,227 A    7/1984 Koch
(Continued)

FOREIGN PATENT DOCUMENTS

JP    2001-293500 A1    10/2001
JP    2003-245509 A1    9/2003
(Continued)

OTHER PUBLICATIONS

International Search Report and Written Opinion (Application No. PCT/JP2017/040484) dated Feb. 6, 2018.
(Continued)

*Primary Examiner* — Claire A Norris
(74) *Attorney, Agent, or Firm* — Burr Patent Law, PLLC

(57) ABSTRACT

A screw type separation device includes: a casing that has a separated liquid discharge port on one end part side and has an object discharge port on the other end part side, while the other end part side is positioned lower, in terms of vertical directions, than the one end part side; a screw shaft provided inside the casing; a first screw blade; and a second screw blade that forms a first space between one face and the first screw blade facing the one face and forms a second space between the other face and the first screw blade facing the other face.

15 Claims, 11 Drawing Sheets

(51) Int. Cl.
*C02F 11/12* (2019.01)
*C02F 3/30* (2023.01)
*B30B 9/16* (2006.01)

(52) U.S. Cl.
CPC .............. *C02F 3/302* (2013.01); *C02F 11/12* (2013.01); *C02F 2301/046* (2013.01)

(58) Field of Classification Search
USPC ....................................................... 210/360.1
See application file for complete search history.

(56) References Cited

U.S. PATENT DOCUMENTS

| | | | |
|---|---|---|---|
| 6,706,199 B2* | 3/2004 | Winter | C10J 3/52 210/769 |
| 2013/0098765 A1* | 4/2013 | Stradi | C02F 11/006 204/627 |
| 2016/0176141 A1* | 6/2016 | Houle | B30B 9/128 100/127 |
| 2017/0050400 A1 | 2/2017 | Sugawara | |

FOREIGN PATENT DOCUMENTS

| | | |
|---|---|---|
| JP | 2017-000910 A | 1/2017 |
| KR | 101 049 965 B1 | 7/2011 |
| WO | 2015/186612 A1 | 12/2015 |

OTHER PUBLICATIONS

Extended European Search Report (Application No. 17902907.9) dated Nov. 25, 2020.
Canadian Office Action (Application No. 3,058,088) dated Aug. 23, 2021.

* cited by examiner

SCREW TYPE SEPARATION DEVICE AND WASTEWATER TREATMENT SYSTEM

BACKGROUND OF THE INVENTION

1. FIELD OF THE INVENTION

The present invention relates to a screw type separation device and a wastewater treatment system.

2. DESCRIPTION OF RELATED ART

Examples of conventional methods used in so-called separation devices such as concentrators and dehydrators include centrifugal methods, flotation concentration methods, and screen concentration dehydration methods. Further, screw type separation devices have been used by which sludge such as sewage or factory wastewater serving as an object with high moisture content is input to a casing that has a circular tubular shape, so that the object is compressed and dehydrated while being conveyed by rotating a screw provided in the casing. For example, Patent Literature 1 describes a device that compresses an object while conveying the object by rotating a screw provided with two screw blades. The device has formed, within a casing, a first region and a second region interposed between the two screw blades. The device conveys the object while dehydrating the object with compression in the first region and further discharges the dehydrated object through a discharge opening for the object. Further, the device conveys separated liquid generated by the dehydration in the second region and further discharges the separated liquid through a discharge opening for the separated liquid.

CITATION LIST

Patent Literature

Patent Literature 1: International Publication No. WO 2015/186612

SUMMARY OF THE INVENTION

Technical Problem

The device described in Patent Literature 1 is configured to perform the dehydration while moving the object by rotating the screw; however, in a case where the object is moved by rotating the screw, because the object is agitated, there is a possibility that separation efficiency of the object, i.e., dehydration efficiency of the object, may not properly be improved.

In view of the circumstances described above, it is an object of the present invention to provide a screw type separation device and a wastewater treatment system capable of preventing the separation efficiency of the object from decreasing.

Solution to Problem

To solve the problem and achieve the object above, a screw type separation device in the present disclosure includes; a casing that has a tubular shape and has, on one end part side, a separated liquid discharge port used for discharging separated liquid that has been separated from an object by dehydration and has, on an other end part side, an object discharge port used for discharging the object that has been dehydrated, while the other end part side is positioned lower, in terms of vertical directions, than the one end part side; a screw shaft provided inside the casing and extending along an extending direction that is a direction from the one end part to the other end part; a first screw blade spirally extending on an outer circumferential surface of the screw shaft; and a second screw blade that spirally extends on the outer circumferential surface of the screw shaft while being positioned apart, in the extending direction, from the first screw blade by a predetermined interval, forms a first space between one of two faces thereof facing the first screw blade and the first screw blade facing the one face, and forms a second space between other of the two faces and the first screw blade facing the other face, wherein the object input to the first space in the casing is moved to the other end part side within the first space and dehydrated by gravity, so that the dehydrated object is discharged through the object discharge port, and the separated liquid occurring from the dehydration is moved from the first space to the second space and is discharged through the separated liquid discharge port.

It is preferable that the first screw blade and the second screw blade have a gap between an outer circumferential part thereof and an inner circumferential surface of the casing, so that the separated liquid is moved from the first space to the second space via the gap.

It is preferable that the screw type separation device includes a controller that controls rotation of the screw shaft, wherein the controller discharges the object by rotating the screw shaft.

It is preferable that the screw type separation device includes a controller that controls rotation of the screw shaft, wherein the controller dehydrates the object by switching between a rotating state and a stopped state of the screw shaft.

It is preferable that the screw type separation device includes a discharge preventing unit that is connected to the object discharge port and blocks the object prior to the dehydration from being discharged through the object discharge port.

It is preferable that the discharge preventing unit includes a flow volume adjusting tank that is connected to the object discharge port, is capable of blocking the object prior to the dehydration from being discharged, by storing therein the object discharged through the object discharge port, and is capable of discharging the object dehydrated and stored through a flow volume adjustment discharge port provided in a higher position, in terms of the vertical directions, than the object discharge port.

It is preferable that the discharge preventing unit includes a discharge pump that is connected to the object discharge port, blocks the object prior to the dehydration that has moved to the other end part of the casing, and forcibly discharges the object dehydrated through the object discharge port.

It is preferable that the screw type separation device includes a partition wall part that is provided for the first space and blocks the object from entering a space positioned on the one end part side with respect to an installation position of the partition wall part.

It is preferable that the second screw blade is configured so that a second screw blade end part being an end part thereof on the one end part side is positioned on the one end part side with respect to a first screw blade end part being an end part of the first screw blade on the one end part side, and a section from the first screw blade end part to the second screw blade end part is a single screw section in which the second screw blade is provided, but the first screw blade is not provided.

It is preferable that the second screw blade is shaped to be a ribbon screw blade on the one end part side with respect to the first screw blade end part.

It is preferable to include a separated liquid discharge pump that is connected to the separated liquid discharge port and that forcibly discharges the separated liquid in the casing.

To solve the problem and achieve the object above, a wastewater treatment system in the present disclosure includes; a solid-liquid separation tank that separates sludge from organic wastewater; and the screw type separation device, wherein the screw type separation device is configured to be able to concentrate the sludge discharged from the solid-liquid separation tank and serving as the object and to return the separated liquid occurring at a time of concentrating the sludge to the solid-liquid separation tank.

It is preferable that the screw type separation device of the wastewater treatment system is provided within the solid-liquid separation tank.

To solve the problem and achieve the object above, a wastewater treatment system in the present disclosure includes; a reaction tank that performs a bioprocess on organic wastewater; a solid-liquid separation tank that separates sludge from the organic wastewater; and the screw type separation device, wherein the screw type separation device is configured to be able to withdraw and concentrate sludge serving as the object from the reaction tank, to return the concentrated sludge to the reaction tank, and to supply the separated liquid occurring at a time of concentrating the sludge to the solid-liquid separation tank.

In the wastewater treatment system, the sludge input to the screw type separation device may not contain flocculating agent.

DETAILED DESCRIPTION OF THE INVENTION

According to the present invention, it is possible to prevent the separation efficiency of the object from decreasing.

DESCRIPTION OF EMBODIMENTS

The following will describe preferred embodiments of the present invention in detail, with reference to the drawings. The present invention is not limited by the embodiments described below.

First Embodiment

A Configuration of a Screw Type Separation Device

Figure 1:
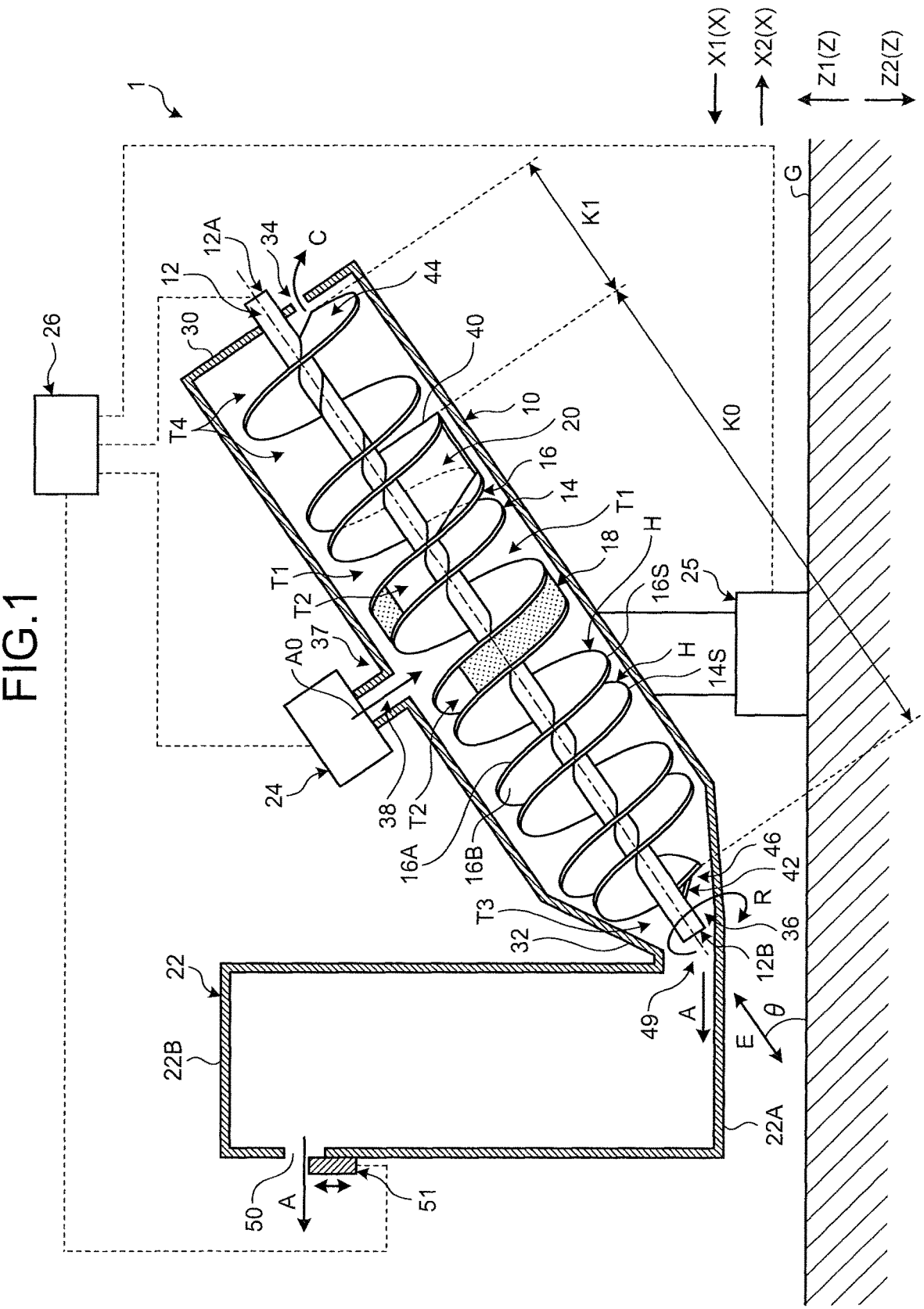
FIG. 1 is a partial cross-sectional view of a screw type separation device according to a first embodiment.

A screw type separation device according to a first embodiment will be explained. FIG. 1 is a partial cross-sectional view of the screw type separation device according to the first embodiment. As illustrated in FIG. 1, a screw type separation device 1 according to the first embodiment includes a casing 10, a screw shaft 12, a first screw blade 14, a second screw blade 16, a cover part 18, a partition wall part 20, a flow volume adjusting tank 22, an input unit 24, a slope adjusting unit 25, and a controller 26. The screw type separation device 1 dehydrates a preliminary object A0 input to the inside of the casing 10 through an object input port 38 (explained later) and discharges an object A resulting from the dehydrating process through an object discharge port 36 (explained later). Further, the screw type separation device 1 discharges separated liquid C separated from the preliminary object A0 in the dehydrating process, through a separated liquid discharge port 34 (explained later). The preliminary object A0 is sludge such as sewage or factory wastewater having a high moisture content. The preliminary object A0 is the object before being dehydrated by the screw type separation device 1. The preliminary object A0 is sludge from which a part of the moisture has been separated by gravitational sedimentation and to which no flocculating agent has been added (i.e., containing no flocculating agent). The moisture content ratio of the preliminary object A0 is in the range of 96% to 99.8% inclusive, for example. However, the preliminary object A0 does not necessarily have to have the properties described above. For example, the preliminary object A0 may be sludge to which a flocculating agent has been added (e.g., sludge to which a small amount of flocculating agent has been added) or may be sludge containing a flocculated solid component and moisture. The screw type separation device 1 generates the object A by dehydrating the preliminary object A0. The object A is the object resulting from the dehydrating process performed by the screw type separation device 1. The object A is sludge obtained by removing a part of the moisture from the preliminary object A0 and of which the moisture content ratio is in the range of 70% to 99.6%, inclusive, for example. However, the moisture content ratio of the object A is not limited to this range.

Hereinafter, the directions parallel to a ground surface G, i.e., the horizontal directions, will be referred to as X-directions. Further, one of the X-directions will be referred to as an X1 direction, whereas the other of the X-directions, i.e., the direction opposite to the X1 direction, will be referred to as an X2 direction. Further, the directions orthogonal to the X-directions and also orthogonal to the ground surface G, i.e., the vertical directions, will be referred to as Z-directions. Further, one of the Z-directions will be referred to as a Z1 direction, whereas the other of the Z-directions, i.e., the direction opposite to the Z1 direction, will be referred to as a Z2 direction. The Z1 direction is the upward vertical direction, i.e., the direction away from the ground surface G, whereas the Z2 direction is the downward vertical direction, i.e., the direction toward the ground surface G side.

As illustrated in FIG. 1, the casing 10 is a tubular member that extends from one end part 30 to other end part 32 along an extending direction E and has a space provided inside thereof. Although the casing 10 is a circular tubular member, the diameter is decreased on the other end part 32 side. For example, the diameter of the casing 10, in the section where the diameter is not decreased, may be approximately in the range of 20 cm to 50 cm inclusive, but the dimension thereof is arbitrary. The extending direction E is the axial direction of the casing 10. From the one end part 30 side to the other end part 32 side, the extending direction E is sloped toward the Z2 direction side with respect to the X1 direction. In other words, toward the other end part 32 (the X1 direction side), the central axis of the casing 10 extending along the extending direction E is sloped in the direction moving toward (to be positioned on) the Z2 direction side. Accordingly, the other end part 32 of the casing 10 is positioned on the Z2 direction side, i.e., positioned lower, in terms of the vertical directions, than the one end part 30. The slope angle θ of the casing 10 is preferably in the range of 20° to 90°, inclusive, and more preferably, in the range of 30° to 45°, inclusive. The slope angle θ is a slope angle of the central axis of the casing 10 extending along the extending direction E, with respect to the horizontal direction X (the ground surface G).

The separated liquid discharge port 34 is opened in the one end part 30 of the casing 10. The object discharge port 36 is opend in the other end part 32 of the casing 10. The separated liquid discharge port 34 is a different opening from a hole through which the screw shaft 12 extends and is provided on the Z2 direction side with respect to the screw shaft 12. It is, sufficient that the separated liquid discharge port 34 is positioned on the one end part 30 side with respect to the object discharge port 36. For example, the separated liquid discharge port 34 may be provided in the one end part 30 on the Z1 direction side with respect to the screw shaft 12 or may be provided in the same position as that of the screw shaft 12 so as to have the screw shaft 12 extend therethrough. In another example, the separated liquid discharge port 34 may be provided on the outer circumferential face (in the lateral face) in a single screw section K1, on the one end part 30 side of the casing 10. The object discharge port 36 is positioned on the Z2 direction side, i.e., positioned lower in terms of the vertical directions, than the separated liquid discharge port 34. The object discharge port 36 is configured to be able to have the screw shaft 12 extend therethrough. The single screw section K1 will be explained later.

Further, the object input port 38 is opened in an intermediate part 37 of the casing 10. The intermediate part 37 is a part positioned between the one end part 30 and the other end part 32 in terms of the extending direction E. In other words, the intermediate part 37 is a part positioned between the separated liquid discharge port 34 and the object discharge port 36. The intermediate part 37 is preferably positioned on the one end part 30 side with respect to the center of the casing 10 in terms of the extending direction E. For example, it is preferable to configure the casing 10 so that the length from the one end part 30 to the intermediate part 37 along the extending direction E is in the range of 20% to 50%, inclusive, of the total length of the casing 10 along the extending direction E. However, as long as the intermediate part 37 is positioned between the one end part 30 and the other end part 32, the position thereof is arbitrary. For example, the intermediate part 37 may be positioned on the other end part 32 side with respect to the center of the casing 10 or may be positioned in the vicinity of the center of the casing 10. The object input port 38 is opened on the outer circumferential face of the casing 10 corresponding to the position of the intermediate part 37.

The screw shaft 12 has a circular columnar shape, is provided inside the casing 10, and extends along the extending direction E. The screw shaft 12 is provided inside of the casing 10 so as to go through the casing 10 along the extending direction E. In other words, one end part 12A of the screw shaft 12 is positioned on the one end part 30 side of the casing 10 and protrudes to the outside of the casing 10 from the one end part 30 of the casing 10. Similarly, the other end part 12B of the screw shaft 12 is positioned on the other end part 32 side of the casing 10 and protrudes to the outside of the casing 10 from the other end part 32 of the casing 10. As for the screw shaft 12, at least one of the one end part 12A and the other end part 12B is connected to a motor (not illustrated) that is axially supported by a bearing (not illustrated). As a result of By driving the motor by the controller 26, the screw shaft 12 is rotated about the extending direction E as the axial in a direction R. In the present embodiment, the direction R is the counterclockwise direction as viewed from the one end part 12A side, but is not limited to this example.

The first screw blade 14 is provided inside of the casing 10 so as to spirally extend on the outer circumferential surface of the screw shaft 12 from one end part 40 to other end part 42. The one end part 40 is the position at which winding of the first screw blade 14 starts. The one end part 40 is positioned between the one end part 30 and the intermediate part 37 of the casing 10. More specifically, the one end part 40 is positioned between the object input port 38 and the separated liquid discharge port 34 of the casing 10. The other end part 42 is the position at which the winding of the first screw blade 14 ends. The other end part 42 is positioned between the intermediate part 37 and the other end part 32 of the casing 10. More specifically, the other end part 42 is positioned between the object input port 38 and the object discharge port 36 of the casing 10. The other end part 42 is preferably positioned at a short distance to the other end part 32 (the object discharge port 36) and is more preferably positioned at the position of the other end part 32, i.e., in the decreased-diameter section of the casing 10.

The first screw blade 14 is wound, from the one end part 40 (the first screw blade end part) to the other end part 42, in the direction opposite to the direction R which is the rotation direction of the screw shaft 12. In other words, in a case where the rotation direction (the direction R) of the screw shaft 12 is the counterclockwise direction as viewed from the one end part 12A side, the first screw blade 14 is provided in a so-called z-winding (right-hand) helical (spiral) formation. On the contrary, in a case where the rotation direction (the direction R) of the screw shaft 12 is the clockwise direction as viewed from the one end part 12A side, the first screw blade 14 is provided in a so-called s-winding (left-hand) helical (spiral) formation. The first screw blade 14 rotates as the screw shaft 12 rotates.

The second screw blade 16 is provided inside of the casing 10 so as to spirally extend on the outer circumferential surface of the screw shaft 12 from one end part 44 (the second screw blade end part) to other end part 46. The second screw blade 16 is provided in a position shifted from the first screw blade 14 by a predetermined interval in the extending direction E. The second screw blade 16 is wound in the same winding direction as that of the first screw blade 14. The second screw blade 16 also rotates as the screw shaft 12 rotates. The one end part 44 of the second screw blade 16 is the position at which winding of the second screw blade 16 starts. The one end part 44 is positioned between the one end part 30 and the intermediate part 37 of the casing 10. More specifically, the one end part 44 is positioned between the object input port 38 and the separated liquid discharge port 34 of the casing 10. Further, the one end part 44 is positioned on the one end part 30 (the separated liquid discharge port 34) side of the casing 10, with respect to the one end part 40 of the first screw blade 14. In other words, the second screw blade 16 spirally extends to the one end part 30 side of the first screw blade 14.

The other end part 46 of the second screw blade 16 is the position at which the winding of the second screw blade 16 ends. The other end part 46 is positioned between the intermediate part 37 and the other end part 32 of the casing 10. More specifically, the other end part 46 is positioned between the object input port 38 and the object discharge port 36 of the casing 10. The other end part 46 is preferably placed at a position where a distance from the position to the other end part 32 (the object discharge port 36) is shorter than a distance from the position to the intermediate part 37 (the object input port 38). More preferably, the other end part 46 is positioned at the position of the other end part 32, i.e., in the decreased-diameter section of the casing 10. The other end part 46 is positioned on the one end part 30 (the separated liquid discharge port 34) side of the casing 10, with respect to the other end part 42 of the first screw blade 14. In other words, the first screw blade 14 spirally extends to the other end part 32 side of the second screw blade 16. However, the positions of the other end part 46 of the second screw blade 16 and the other end part 42 of the first screw blade 14 are not limited to those in the present example and may be in the same position for example.

As explained above, the second screw blade 16 extends from the other end part 46 to the one end part 44. In contrast, the first screw blade 14 extends from the other end part 42 to the one end part 40. Accordingly, the section from the other end part 46 of the second screw blade 16 to the one end part 40 (the first screw blade end part) of the first screw blade 14 is a double screw section K0. The section from the one end part 40 (the first screw blade end part) of the first screw blade 14 to the one end part 44 (the second screw blade end part) of the second screw blade 16 is the single screw section K1. The double screw section K0 is a section in which both the first screw blade 14 and the second screw blade 16 are provided. The single screw section K1 is a section in which only the second screw blade 16 is provided, but the first screw blade 14 is not provided. The single screw section K1 is preferably shorter than the double screw section K0 and is preferably longer than a certain length. The length of the single screw section K1 is preferably in the range of 50% to 90%, inclusive, of the length of the double screw section K0.

A section from the other end part 46 of the second screw blade 16 to the other end part 42 of the first screw blade 14 is a section in which the first screw blade 14 is provided, but the second screw blade 16 is not provided.

The second screw blade 16 is preferably shaped to be a ribbon screw blade, on the one end part 30 side with respect to the first screw blade 14 i.e., in the single screw section K1 from the position of the one end part 40 of the first screw blade 14 to the one end part 44 of the second screw blade 16. With the ribbon-screw shape, it is possible to prevent the object A from causing internal obstructions. The ribbon-screw shape denotes a shape in which an opening (a gap) is provided in the region positioned between an outer circumferential part 16S of the second screw blade 16 and the screw shaft 12. In other words, on the one end part 30 side with respect to the first screw blade 14, the second screw blade 16 has the opening in the region positioned between the outer circumferential part 16S and the outer circumference of the screw shaft 12.

The face of the second screw blade 16 positioned on the one end part 30 side in terms of the extending direction E will be referred to as one face 16A. The face of the second screw blade 16 positioned on the other end part 32 side in terms of the extending direction E will be referred to as the other face 16B. The two faces, namely the one face 16A and the other face 16B, each face the first screw blade 14 along the extending direction E. More specifically, the one face 16A faces the first screw blade 14 positioned on the one end part 30 side. In contrast, the other face 16B faces the first screw blade 14 positioned on the other end part 32 side. The second screw blade 16 forms a first space T1 between the one face 16A and the first screw blade 14 facing the first face 16A. Further, the second screw blade 16 forms a second space T2 between the other face 16B and the first screw blade 14 facing the other face 16B. The first space T1 is a part of the space formed inside the casing 10 and is a space in which the object A is conveyed on the other end part 32 side with respect to the partition wall part 20 (explained later). The second space T2 is a part of the space formed inside the casing 10 and is a space in which the separated liquid C is conveyed. The first space T1 is isolated from the second space T2 by the first screw blade 14 and the second screw blade 16. The distance between the first screw blade 14 and the second screw blade 16 in the first space T1 is longer than the distance between the first screw blade 14 and the second screw blade 16 in the second space T2. Accordingly, the first space T1 has a larger capacity than the second space T2. Because the first space T1 and the second space T2 are each interposed between the first screw blade 14 and the second screw blade 16, the first space T1 and the second space T2 are positioned within the section of the double screw section K0.

Further, an outer circumferential part 14S of the first screw blade 14 is configured so that a gap H is formed between the outer circumferential part 14S and the inner circumferential surface of the casing 10. In other words, the outer circumferential part 14S of the first screw blade 14 is not in contact with the inner circumferential surface of the casing 10 and is positioned apart by the gap H. Similarly, the outer circumferential part 16S of the second screw blade 16 is configured so that a gap H is formed between the outer circumferential part 16S and the inner circumferential surface of the casing 10. In other words, the outer circumferential part 16S of the second screw blade 16 is not in contact with the inner circumferential surface of the casing 10 and is positioned apart by the gap H. The gap H is a small gap and has such a dimension that prevents (blocks) at least a part of the object A from passing therethrough. Further, the gap H has such a dimension that allows liquid components like the separated liquid C to pass therethrough. Specifically, the gap H is a gap of approximately 1 mm to 2 mm, for example. As a result, the first space T1 and the second space T2 are communicated in the region of the gap H, but are blocked each other in the region other than the gap H.

Further, a third space T3 is formed between the other end part 46 of the second screw blade 16 and the other end part 32 (the object discharge port 36) of the casing 10. The third space T3 is a part of the space formed inside the casing 10 and communicates with the other end part 32 side of the first space T1. The third space T3 is a space which the object A that has been conveyed through the first space T1 enters. The third space T3 communicates with the second space T2 in the region of the gap H and is blocked from the space T2 in the other region. A fourth space T4 is formed between the one end part 40 of the first screw blade 16 and the one end part 30 (the separated liquid discharge port 34) of the casing 10. The fourth space T4 is a part of the space formed inside the casing 10 and communicates with the one end part 30 side of the second space T2. The fourth space T4 is a space which the separated liquid C that has been conveyed through the second space T2 enters. The fourth space T4 communicates with the first space T1 in the region of the gap H and is blocked from the first space T1 in the other region. In other words, the fourth space T4 is a space formed between the partition wall part 20 (explained later) and the one end part 30 (the separated liquid discharge port 34) of the casing 10. The fourth space T4 is a space within the single screw section K1.

The cover part 18 is provided in a region between the first screw blade 14 and the second screw blade 16 forming the second space T2, the region overlaps with an opening region of the object input port 38. When the preliminary object A0 is input through the object input port 38, the cover part 18 is able to prevent the preliminary object A0 from being input to the second space T2. The cover part 18 does not necessarily have to be provided. For example, as explained later, when the preliminary object A0 is input while the rotation of the screw shaft 12 is in a stopped state, the first screw blade 14 and the second screw blade 16 are arranged in such a manner that the opening region of the object input port 38 overlaps with the first space T1. Accordingly, it is possible to input the preliminary object A0, while the opening region of the object input port 38 remains in the state of not overlapping with the second space T2. Consequently, in that situation, it is possible to prevent the preliminary object A0 from being input to the second space T2, without providing the cover part 18.

The partition wall part 20 is a baffle that blocks the object A from flowing out to the separated liquid discharge port 34 (the fourth space T4). The partition wall part 20 is positioned between the one end part 30 and the intermediate part 37 of the casing 10. More specifically, the partition wall part 20 is positioned between the object input port 38 and the separated liquid discharge port 34 of the casing 10. The partition wall part 20 is more preferably provided in the same position as the one end part 40 of the first screw blade 14 is. In the first space T1, the partition wall part 20 is in contact with the screw shaft 12, the first screw blade 14, and the second screw blade 16. More specifically, the partition wall part 20 is arranged to overlap with a region enclosed by the screw shaft 12, the first screw blade 14, and the second screw blade 16. Accordingly, the partition wall part 20 separates the one end part 30 side and the other end part 32 side from each other at an installation position thereof (the one end part 40 of the first screw blade 14 in the present example). In other words, the partition wall part 20 separates the first space T1 and the fourth space T4 from each other and blocks the object A from entering the space positioned on the one end part 30 side with respect to the installation position thereof. More specifically, the partition wall part 20 is provided between the double screw section K0 and the single screw section K1.

More specifically, the partition wall part 20 extends toward the radially outside of the screw shaft 12, from a position between the first screw blade 14 and the second screw blade 16 on the outer circumferential surface of the screw shaft 12. In other words, the partition wall part 20 is a plate-like member of which the basal end part is attached to the outer circumferential surface of the screw shaft 12 and of which the tip end part extends toward the radially outside. One lateral face of the partition wall part 20 positioned on the one end part 30 side is connected to the second screw blade 16, whereas the other lateral face of the partition wall part 20 positioned on the other end part 32 side is connected to the first screw blade 14, so that the partition wall part 20 extends along the extending direction E from the one lateral face to the other lateral face. Further, the tip end part of the partition wall part 20 extends along the radial direction of the screw shaft 12 to the same position as the positions of the outer circumferential parts of the first screw blade 14 and the second screw blade 16. In other words, in the same manner as the first screw blade 14 and the second screw blade 16, the partition wall part 20 forms a gap H between the partition wall part 20 and the inner circumferential surface of the casing 10.

Although the partition wall part 20 is provided to prevent the object A in the first space T1 from entering the inside of the fourth space T4, the partition wall part 20 does not necessarily have to be provided. Even if the partition wall part 20 were not provided, the object A would be prevented from being discharged through the separated liquid discharge port 34 as being hindered by the interface (the surface) between the object A and the air. However, when the casing 10 has a smaller sloped angle, it is more preferable to provide the partition wall part 20.

The flow volume adjusting tank 22 is a tank connected to the object discharge port 36. The flow volume adjusting tank 22 stores the post-dehydration object A discharged through the object discharge port 36 and serves as a discharge preventing unit that blocks the pre-dehydration object A and the separated liquid C from being discharged to the outside through the object discharge port 36 so as to keep the separated liquid C within the casing 10. The flow volume adjusting tank 22 is a container having a bottom face part 22A and a top face part 22B and has a space formed therein. The bottom face part 22A is an end face of the flow volume adjusting tank 22 positioned on the Z2 direction side, whereas the top face part 22B is an end face of the flow volume adjusting tank 22 positioned on the Z1 direction side. The flow volume adjusting tank 22 is positioned on the Z1 direction side with respect to the object discharge port 36. In other words, at least the top face part 22B is positioned on the Z1 direction side with respect to the object discharge port 36. Further, the flow volume adjusting tank 22 has a connection port 49 and a flow volume adjustment discharge port 50 opened therein. The connection port 49 is an opening provided on the Z2 direction side (on the bottom face part 22A side) of a lateral face of the flow volume adjusting tank 22. The connection port 49 communicates with the object discharge port 36 of the casing 10. The flow volume adjustment discharge port 50 is an opening provided on the Z1 direction side (the top face part 22B side) of a lateral face of the flow volume adjusting tank 22. The flow volume adjustment discharge port 50 is preferably provided in the same position as that of the separated liquid discharge port 34 of the casing 10 in terms of the Z direction. However, as long as the flow volume adjustment discharge port 50 is provided on the Z1 direction side with respect to the connection port 49 communicating with the object discharge port 36, the position of the flow volume adjustment discharge port 50 is arbitrary. As explained herein, the flow volume adjusting tank 22 is connected to the object discharge port 36 and is capable of blocking the pre-dehydration object A from being discharged by storing therein the post-dehydration object A that has been discharged through the object discharge port 36 and capable of discharging the stored post-dehydration object A through the flow volume adjustment discharge port 50. It should be noted, however, as long as the flow volume adjusting tank 22 is capable of blocking the pre-dehydration object A and the separated liquid C from being discharged to the outside through the object discharge port 36, the capacity thereof may be small.

Further, the flow volume adjusting tank 22 may have an adjusting barrier part 51 attached to the flow volume adjustment discharge port 50. The adjusting barrier part 51 is provided on the Z2 direction side with respect to the flow volume adjustment discharge port 50 and is movable along the Z directions under control of the controller 26. When being moved to the Z1 direction side, the adjusting barrier part 51 covers at least a part of the region of the flow volume adjustment discharge port 50 positioned on the Z2 direction side. On the contrary, when being moved to the Z2 direction side, the adjusting barrier part 51 makes the flow volume adjustment discharge port 50 open. The adjusting barrier part 51 is movable in accordance with the liquid level of the separated liquid C in the casing 10.

The input unit 24 is a device that is connected to the object input port 38 and controls the amount of the preliminary object A0 to be input to the inside of the casing 10. The input unit 24 is an open/close valve, for example, and causes the preliminary object A0 to be input to the inside of the casing 10 when being open and stops the preliminary object A0 from being input to the inside of the casing 10 when being closed. Further, the input unit 24 is also capable of adjusting the input amount of the preliminary object A0 by adjusting the opening degree thereof. Under the control of the controller 26, the input unit 24 controls the input amount of the preliminary object A0 to the inside of the casing 10. However, as long as the input unit 24 is capable of controlling the input amount of the preliminary object A0 to the inside of the casing 10, the input unit 24 does not necessarily have to be an open/close valve and may be a pump that conveys the sludge, for example.

The slope adjusting unit 25 is attached to the casing 10. Under the control of the controller 26, the slope adjusting unit 25 changes the slope angle θ of the casing 10. However, the slope adjusting unit 25 does not necessarily have to be provided, and the slope angle θ may be constant.

The controller 26 is a controlling device that controls operations of the screw type separation device 1. The controller 26 controls the rotation of the screw shaft 12, the amount of the preliminary object A0 input by the input unit 24, and changes in the slope angle θ made by the slope adjusting unit 25.

An Operation of the Screw Type Separation Device

Figure 2:
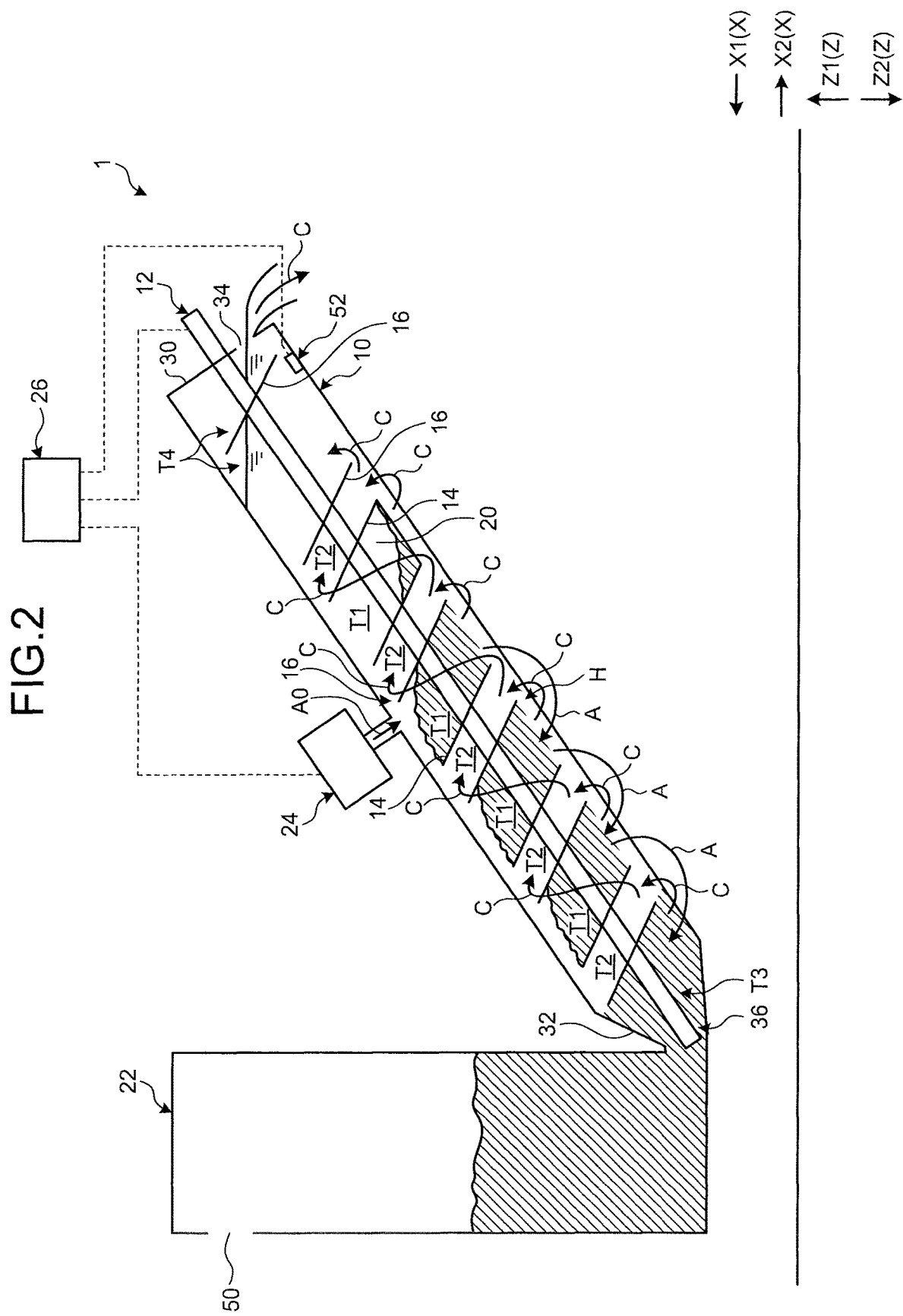
FIG. 2 is a schematic drawing for explaining an operation of the screw type separation device according to the first embodiment.
Figure 3:
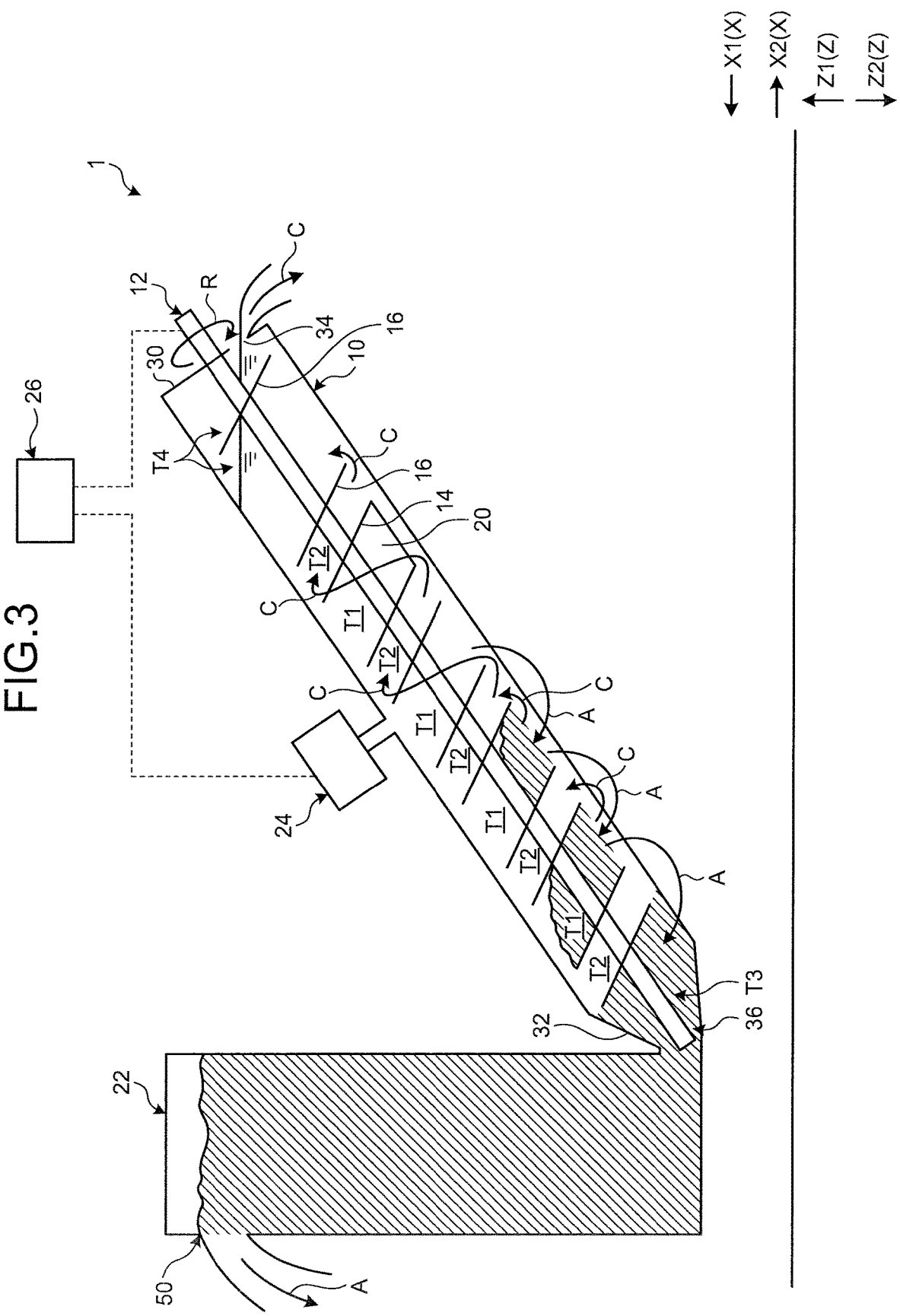
FIG. 3 is another schematic drawing for explaining the operation of the screw type separation device according to the first embodiment.

Next, an operation of the screw type separation device 1 configured as described above and behaviors of the object will be explained. FIGS. 2 and 3 are schematic drawings for explaining the operation of the screw type separation device according to the first embodiment.

As illustrated in FIG. 2, the controller 26 controls the input unit 24 and inputs the preliminary object A0 to the inside of the casing 10 through the object input port 38. The preliminary object A0 that has been input through the object input port 38 is input to the inside of the first space T1. Further, when inputting the preliminary object A0, the controller 26 stops the rotation of the screw shaft 12. In other words, while the rotation of the screw shaft 12 is stopped, the controller 26 inputs the preliminary object A0 to the inside of the first space T1. The casing 10 is sloped so that the other end part 32 side is positioned toward the Z2 direction, i.e., positioned lower in terms of the vertical directions. Accordingly, the preliminary object A0 input to the inside of the first space T1 moves to the other end part 32 side due to gravity. More specifically, the preliminary object A0 spirally moves through the first space T1 to the other end part 32 side, along the first screw blade 14 and the second screw blade 16 due to gravity. The preliminary object A0 flows into the third space T3. Further, when the preliminary object A0 continues to be input, the preliminary object A0 accumulates inside the third space T3 and the first space T1.

The preliminary object A0 contains a liquid component. As explained above, the gap H allows the liquid component of the object, i.e., the separated liquid C to pass therethrough. Accordingly, the separated liquid C from the preliminary object A0 input to the inside of the first space T1 is introduced to the inside of the second space T2 via the gap H. Further, the liquid component, i.e., the separated liquid C is separated from the preliminary object A0 due to gravity, so that the moisture content ratio of the preliminary object A0 decreases. The separated liquid C is introduced to the second space T2 from the first space T1 via the gap H. In the present embodiment, the preliminary object A0 is separated into the object A and the separated liquid C in this manner.

As for the separated liquid C introduced to the second space T2, the liquid level within the second space T2 rises toward the Z1 direction side, as the introduced amount increases. As the liquid level rises, the separated liquid C moves beyond the screw shaft 12 and is introduced to the inside of the fourth space T4 by spirally moving through the second space T1 to the one end part 30 side along the first screw blade 14 and the second screw blade 16. The separated liquid C introduced to the inside of the fourth space T4 is discharged to the outside through the separated liquid discharge port 34 due to a further rise of the liquid level. Further, a small amount of the solid component (the object A) may accidentally enter the fourth space T4. However, the fourth space T4 is in the single screw section K1 and communicates with the second space T2. Accordingly, the solid component in the fourth space T4 moves to the other end part 32 side along the second space T2 due to the weight thereof. Consequently, the solid component is separated from the separated liquid C so that the separation efficiency (the level of cleanliness) of the separated liquid C is prevented from decreasing.

Further, as for the post-separation (post-dehydration) object A accumulated in the third space T3 and the first space T1, because the accumulated amount increases as the preliminary object A0 is input, the separation amount of the separated liquid C increases due to an increase in the weight, and the moisture content ratio decreases. Because the separation is accelerated in this manner, the volume of the object A is prevented from increasing. However, as the preliminary object A0 is input, there may be some situations where the volume of the object A increases to a certain extent, and the position of the surface thereof (the interface with the separated liquid or the air) rises toward the Z1 direction side. However, because the first space T1 is provided with the partition wall part 20, the object A is prevented from being introduced to the fourth space T4. Further, in a case where the preliminary object A0 continues to be input, the post-dehydration object A accumulating in the third space T3 is pushed out to the inside of the flow volume adjusting tank 22 by the preliminary object A0. Accordingly, the object A that has been dehydrated to a certain extent in the casing 10 accumulates in the flow volume adjusting tank 22. As a result of the post-dehydration object A accumulating therein in this manner, the flow volume adjusting tank 22 holds the pre-dehydration preliminary object A0 and the separated liquid C within the casing 10 and thus prevents the pre-dehydration preliminary object A0 and the separated liquid C from being discharged to the outside through the object discharge port 36. Accordingly, the separated liquid C keeps accumulating in the second space T2 as explained above and is discharged to the outside through the separated liquid discharge port 34. The object A has a certain level of viscosity. Consequently, while the rotation of the screw shaft 12 is stopped, even when the position of the surface of the object A in the flow volume adjusting tank 22 is higher than the flow volume adjustment discharge port 50, the object A remains in the flow volume adjusting tank 22 and is prevented from being discharged through the flow volume adjustment discharge port 50. However, if the preliminary object A0 had a low concentration level (had a high moisture content), for example, the object A might be discharged through the flow volume adjustment discharge port 50, even while the rotation of the screw shaft 12 is stopped.

As explained above, the first screw blade 14 and the second screw blade 16 cause the preliminary object A0 input to the first space T1 to be moved to the other end part 32 side within the first space T1 and dehydrated, by gravity. Further, the first screw blade 14 and the second screw blade 16 discharge the dehydrated object A through the object discharge port 36. Further, the first screw blade 14 and the second screw blade 16 move the separated liquid C generated by the dehydrating process from the first space T1 to the second space T2 via the gap H and move the separated liquid C to the one end part 30 side within the second space T2. In this manner, the first screw blade 14 and the second screw blade 16 discharge the separated liquid C through the separated liquid discharge port 34. Further, while the preliminary object A0 is being input to the inside of the casing 10, the controller 26 stops the rotation of the screw shaft 12, so that the preliminary object A0 is moved to the other end part 32 side within the first space T1 and dehydrated by gravity.

The controller 26 continues to input the preliminary object A0 to the inside of the casing 10 for a predetermined time period D1, while the rotation of the screw shaft 12 is stopped. When the predetermined time period D1 has elapsed, the controller 26 stops inputting the preliminary object A0 and rotates the screw shaft 12 as illustrated in FIG. 3. The controller 26 rotates the screw shaft 12 in such a direction that the object A in the first space T1 moves to the other end part 32 side. In other words, the first screw blade 14 and the second screw blade 16 rotate as the screw shaft 12 rotates. As a result of the rotations of the first screw blade 14 and the second screw blade 16, the object A in the first space T1 spirally moves toward the other end part 32. Further, during the move caused by the rotations, more separated liquid C is separated from the object A, and the moisture content ratio of the object A decreases. Further, the object A moves through the first space T1 and enters the third space T3. As a result, the object A in the third space T3 is pushed out to the inside of the flow volume adjusting tank 22 and applies pressure to the object A in the flow volume adjusting tank 22. Consequently, the object A in the flow volume adjusting tank 22 is pushed out (forcibly discharged) to the outside through the flow volume adjustment discharge port 50.

As explained above, while the object A is being moved by the rotation of the screw shaft 12, separated liquid C is separated therefrom further more. Accordingly, the liquid level of the separated liquid C within the second space T2 continues to rise and continues to be discharged to the outside through the separated liquid discharge port 34.

The controller 26 continues to rotate the screw shaft 12 for a predetermined time period D2, while the input of the preliminary object A0 is stopped. As a result, the accumulated amounts of the object A in the casing 10 and in the flow volume adjusting tank 22 decrease. When the predetermined time period D2 has elapsed, the process of stopping the rotation of the screw shaft 12 and starting to input the preliminary object A0 is resumed, as illustrated in FIG. 2. In the following sections, the process illustrated in FIG. 2, i.e., the process of inputting the preliminary object A0 to the inside of the casing 10 while the rotation of the screw shaft 12 is stopped will be referred to as an object input process. Further, the process illustrated in FIG. 3, i.e., the process of rotating the screw shaft 12 while the input of the preliminary object A0 is stopped will be referred to as an object discharge process. The controller 26 repeatedly performs the object input process and the object discharge process. The time period in one cycle of the object input process, i.e., the predetermined time period D1, is 15 minutes, for example. The time period in one cycle of the object discharge process, i.e., the predetermined time period D2, is 45 minutes, for example. These lengths of time periods are merely examples. Further, the predetermined time period D2 is preferably 1.5 times to 10 times, inclusive, longer than the predetermined time period D1. The controller 26 resumes the object input process while a certain amount of object A remains in the casing 10 and the flow volume adjusting tank 22. However, the controller 26 may resume the object input process after all the object A has been discharged from the inside of the casing 10 and the flow volume adjusting tank 22.

The screw type separation device 1 according to the present embodiment discharges the object A to the outside by rotating the screw shaft 12 in the manner described above. Further, the screw type separation device 1 dehydrates the preliminary object A0 by switching between the rotating state and the stopped state of the screw shaft 12. In other words, by performing the object input process and the object discharge process, the screw type separation device 1 is capable of dehydrating the preliminary object A0 and discharging the dehydrated object A and the separated liquid C having been separated to the outside, separately from each other.

Figure 4:
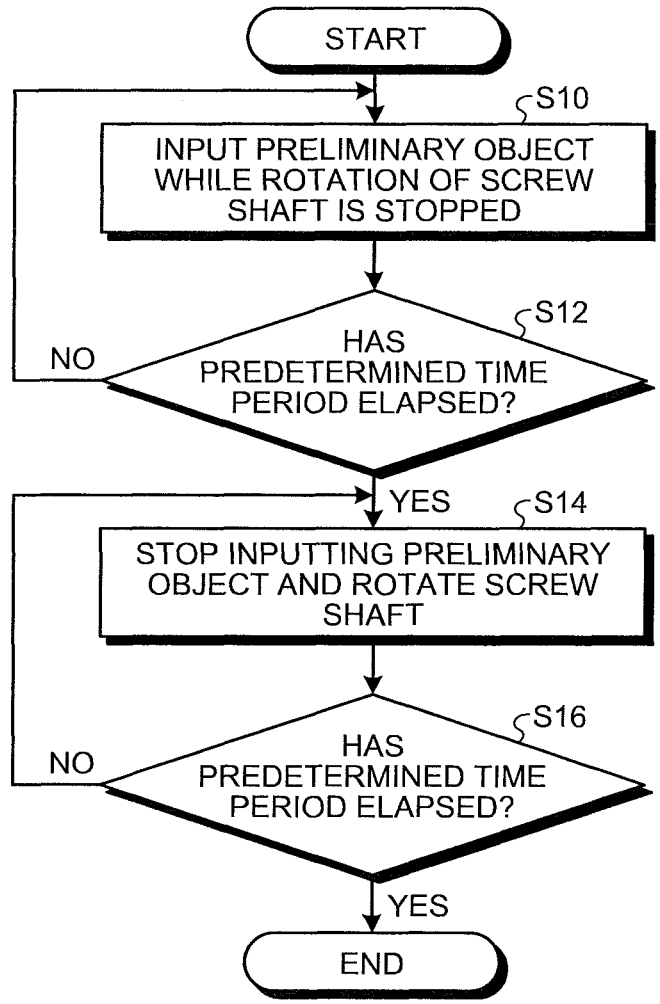
FIG. 4 is a flowchart for explaining a flow in a dehydrating process performed on a preliminary object according to the first embodiment.

A flow in the dehydrating process performed on the preliminary object A0 by the controller 26 described above will be explained on the basis of a flowchart. FIG. 4 is the flowchart for explaining the flow in the dehydrating process performed on the preliminary object according to the first embodiment. As illustrated in FIG. 4, the controller 26 at first inputs the preliminary object A0 to the inside of the casing 10, while the rotation of the screw shaft 12 is stopped (step S10). In other words, the controller 26 performs the object input process and causes the preliminary object A0 to be moved to the other end part 32 side within the first space T1 and dehydrated, by gravity. Further, the controller 26 moves the separated liquid C occurring from the dehydrating process from the first space T1 to the second space T2 and lets the liquid level to rise within the second space T2. As a result, the separated liquid C in the second space T2 is discharged through the separated liquid discharge port 34 via the fourth space T4.

The controller 26 continues to input the preliminary object A0 while the rotation of the screw shaft 12 is stopped and judges whether or not the predetermined time period D1 has elapsed since the process was started (step S12). When the controller 26 determines that the predetermined time period D1 has not elapsed (step S12: No), the process returns to step S10 where the controller 26 continues the object input process. When determining that the predetermined time period D1 has elapsed (step S12: Yes), the controller 26 stops inputting the preliminary object A0 and rotates the screw shaft 12 (step S14). In other words, the controller 26 performs the object discharge process and discharges the separated liquid C through the separated liquid discharge port 34, while discharging the object A through the flow volume adjustment discharge port 50. In this situation, the controller 26 at first stops inputting the preliminary object A0, and when a predetermined time period has elapsed, the controller 26 rotates the screw shaft 12. With this arrangement, the controller 26 is able to start rotating the screw shaft 12 after the preliminary object A0 has settled down. The controller 26 continues the process of rotating the screw shaft 12 while the input of the preliminary object A0 is stopped and judges whether or not the predetermined time period D2 has elapsed since the process was started (step S16). When the controller 26 determines that the predetermined time period D2 has not elapsed (step S16: No), the process returns to step S14 and the controller 26 continues the object discharge process. When the controller 26 determines that the predetermined time period D2 has elapsed (step S16: Yes), the process is finished, but the process may return to step S10 so as to resume the object input process. When the object input process is resumed, the controller 26 starts inputting the preliminary object A0 after stopping the rotation of the screw shaft 12.

In the description above, the switching between the object input process and the object discharge process is triggered by the lapse of the predetermined time periods D1 and D2; however, triggers for the switching is not limited to this example. For instance, as illustrated in FIG. 2, the screw type separation device 1 may include a separated liquid property detecting unit 52 so as to switch between the object input process and the object discharge process on the basis of a detection result obtained by the separated liquid property detecting unit 52. The separated liquid property detecting unit 52 is a sensor that detects properties of the separated liquid C, which is, in the present example, the Suspended Solid (SS) concentration level. While performing the object input process, the controller 26 may obtain a detection result from the separated liquid property detecting unit 52, and in a case where the detection result is equal to or larger than a prescribed threshold value (the SS concentration is equal to or higher than a predetermined concentration threshold value), the controller 26 may switch from the object input process to the object discharge process. On the contrary, while performing the object discharge process, the controller 26 may obtain a detection result from the separated liquid property detecting unit 52, and in a case where the detection result is smaller than the prescribed threshold value (the SS concentration is lower than the predetermined concentration threshold value), the controller 26 may switch from the object discharge process to the object input process. In that situation, the threshold value used for switching from the object discharge process to the object input process is preferably larger than the threshold value used for switching from the object input process to the object discharge process. However, that the switching control realized by the separated liquid property detecting unit 52 is merely an example.

Further, in the description above, the object input process and the object discharge process are switched between each other; however, the object input process and the object discharge process do not necessarily have to be switched between each other. In that situation, while inputting the object A to the inside of the casing 10, the controller 26 rotates the screw shaft 12. The process of rotating the screw shaft 12 while inputting the object A to the inside of the casing 10 is a process of continuing to input the preliminary object A0 to the inside the first space T1 in the object discharge process illustrated in FIG. 3. In that situation, the preliminary object A0 is dehydrated while moving toward the other end part 32 side due to gravity and the rotation of the screw shaft 12 and is separated into the object A and the separated liquid C. By the rotation of the screw shaft 12, the object A is pushed out to the flow volume adjusting tank 22 through the object discharge port 36 and is discharged through the flow volume adjustment discharge port 50. Further, the separated liquid C accumulates within the second space T2 and is discharged through the separated liquid discharge port 34. When the screw shaft 12 is rotated while the preliminary object A0 is being input in this manner, it is preferable to provide the cover part 18.

As explained above, the screw type separation device 1 according to the present embodiment includes the casing 10, the screw shaft 12, the first screw blade 14, and the second screw blade 16. The casing 10 has the separated liquid discharge port 34 on the one end part 30 side and has the object discharge port 36 on the other end part 32 side. The separated liquid discharge port 34 is an opening through which the separated liquid C separated from the object by the dehydrating process is discharged. The object discharge port 36 is an opening through which the dehydrated object A is discharged. The casing 10 is arranged so that the other end part 32 side is positioned lower (on the Z2 direction side) than the one end part 30 side, in terms of the vertical directions. The screw shaft 12 is provided inside the casing 10 and extends along the extending direction E, which is the direction leading from the one end part 30 to the other end part 32. The first screw blade 14 spirally extends on the outer circumferential surface of the screw shaft 12. The second screw blade 16 spirally extends on the outer circumferential surface of the screw shaft 12 while being positioned apart, in the extending direction E, from the first screw blade 14 by the predetermined interval. The second screw blade 16 forms the first space T1 between the one (the one face 16A) of the two faces (the one face 16A and the other face 16B) facing the first screw blade and the first screw blade 14 facing the one face 16A. The second screw blade 16 forms the second space T2 between the other (the other face 16B) of the two faces and the first screw blade 14 facing the other face 16B. The screw type separation device 1 causes the object input to the first space T1 in the casing 10 to be moved to the other end part 32 side within the first space T1 and dehydrated, by gravity. Further, the screw type separation device 1 discharges the dehydrated object A through the object discharge port 36. The screw type separation device 1 moves the separated liquid C generated by the dehydrating process from the first space T1 to the second space T2 and discharges the separated liquid C through the separated liquid discharge port 34.

The screw type separation device 1 is arranged in such a manner that the other end part 32 provided with the object discharge port 36 is positioned lower, in terms of the vertical directions, than the one end part 30 provided with the separated liquid discharge port 34. Accordingly, the preliminary object A0 input to the first space T1 in the casing 10 moves (settles down) within the first space T1 toward the other end part 32 side, due to gravity. Consequently, when moving the object A toward the discharge side, the screw type separation device 1 is able to cause the object A to be moved by gravity. Further, the screw type separation device 1 is able to have the object A and the separated liquid C separated from each other by gravity. For this reason, while the dehydrating and discharging processes, the screw type separation device 1 is able to reduce the rotation speed of the screw shaft 12. Consequently, by using the screw type separation device 1 configured as described above, it is possible to prevent the object from being agitated excessively and to prevent the separation efficiency of the object from decreasing.

Further, the first screw blade 14 and the second screw blade 16 each have the gap H between the outer circumferential part 14S, 16S and the inner circumferential surface of the casing 10 so as to move the separated liquid C from the first space T1 to the second space T2 via the gap H. The screw type separation device 1 is able to prevent, in a more suitable manner, the separation efficiency of the object from decreasing, by preventing the object A from moving through the gap H, while allowing the separated liquid C to move via the gap H.

Further, the screw type separation device 1 includes the controller 26 that controls the rotation of the screw shaft 12. The controller 26 discharges the object A by rotating the screw shaft 12. The screw type separation device 1 configured in this manner is able to properly discharge the dehydrated object A to the outside, with the rotation of the screw shaft 12.

Further, the screw type separation device 1 includes the controller 26 that controls the rotation of the screw shaft 12. The controller 26 dehydrates the object by switching between the rotating state and the stopped state of the screw shaft 12. The screw type separation device 1 configured in this manner is able to improve the separation efficiency of the object by switching between the state in which the screw shaft 12 is rotated and the state in which the screw shaft 12 is stopped (by performing the concise operation).

Further, the screw type separation device 1 includes the discharge preventing unit. The discharge preventing unit is connected to the object discharge port 36 and blocks the pre-dehydration object (the preliminary object A0) from being discharged through the object discharge port 36. The screw type separation device 1 configured in this manner prevents the preliminary object A0 and the separated liquid C from flowing to the outside through the object discharge port 36, by blocking the pre-dehydration object from being discharged out of the casing 10 with the use of the discharge preventing unit.

Accordingly, the discharge preventing unit assists the process of storing the separated liquid C in the casing 10 and discharging the separated liquid C that has properly been separated, through the separated liquid discharge port 34. Further, as a result of the discharge preventing unit storing the preliminary object A0 in the casing 10, it is possible to stabilize the flow speed of the preliminary object A0 in the casing 10.

Further, the screw type separation device 1 includes the flow volume adjusting tank 22 as a discharge preventing unit. The flow volume adjusting tank 22 is connected to the object discharge port 36 and is configured to be able to block the pre-dehydration object (the preliminary object A0) from being discharged by storing therein the object A discharged through the object discharge port 36 and to discharge the stored post-dehydration object A through the flow volume adjustment discharge port 50 provided in a higher position, in terms of the vertical directions, than the object discharge port 36. By blocking the preliminary object A0 from being discharged with the use of the flow volume adjusting tank 22, the screw type separation device 1 configured in this manner prevents, in a more suitable manner, the preliminary object A0 and the separated liquid C from being discharged through the object discharge port 36 and stabilizes the flow speed of the preliminary object A0 in the casing 10, while reducing the costs with the simple configuration. In the present embodiment, although the flow volume adjusting tank 22 is provided as a discharge preventing unit, as long as it is possible to block the pre-dehydration object (the preliminary object A0) from being discharged through the object discharge port 36, the discharge preventing unit is not limited to the structure using the flow volume adjusting tank 22.

Further, the screw type separation device 1 includes the partition wall part 20. The partition wall part 20 is provided for the first space T1 and blocks the object A from entering the space positioned on the one end part 30 side with respect to the installation position thereof. By having the partition wall part 20, the screw type separation device 1 configured in this manner is able to prevent the object A from being mixed with the separated liquid C and to prevent the separation efficiency of the object from decreasing, in a suitable manner.

Further, in the second screw blade 16, the end part 44 (the second screw blade end part) positioned on the one end part 30 side is positioned on the one end part 30 side, with respect to the end part 40 (the first screw blade end part) of the first screw blade 14 positioned on the one end part 30 side. The section from the first screw blade end part to the second screw blade end part is the single screw section K1 in which the second screw blade 16 is provided, but the first screw blade 14 is not provided. In the screw type separation device 1 configured in this manner, there is a possibility that the separated liquid C that has flowed into the fourth space T4 may contain a solid component. In the screw type separation device 1 configured in this manner, because the fourth space T4 is the single screw section K1, the fourth space T4 communicates with the second space T2. Accordingly, the solid component that accidentally entered the fourth space T4 settles down within the second space T2, due to gravity, to the other end part 32 side. Consequently, the screw type separation device 1 configured in this manner is able to improve the separation efficiency of the separated liquid C in the fourth space T4, in a more suitable manner. Further, by moving the solid component to the second space T2, the screw type separation device 1 configured in this manner prevents the solid component from accumulating in the fourth space T4 and congesting.

Further, the second screw blade 16 may be shaped to be a ribbon screw blade on the one end part 30 side with respect to the first screw blade end part. Because the second screw blade 16 configured in this manner is shaped to be the ribbon screw blade on the one end part 30 side with respect to the first screw blade 14, i.e., in the fourth space T4, it is possible to keep small such an area in the fourth space T4 that is blocked by the blade. Accordingly, the screw type separation device 1 configured in this manner has a larger moving region where the solid component that has accidentally entered the fourth space T4 settles down. It is therefore possible to assist the settling-down of the solid component in a more suitable manner and to improve the separation efficiency of the separated liquid C in a more suitable manner. In addition, by moving the solid component to the second space T2, the screw type separation device 1 configured in this manner is able to prevent the solid component from accumulating in the fourth space T4 and congesting, in a more suitable manner.

Second Embodiment

Next, a second embodiment will be explained. A screw type separation device 1A according to the second embodiment is different from the device in the first embodiment for being provided with a discharge pump 62 in place of the flow volume adjusting tank 22. The explanations of elements of the second embodiment having the same configurations as those in the first embodiment will be omitted.

Figure 5:
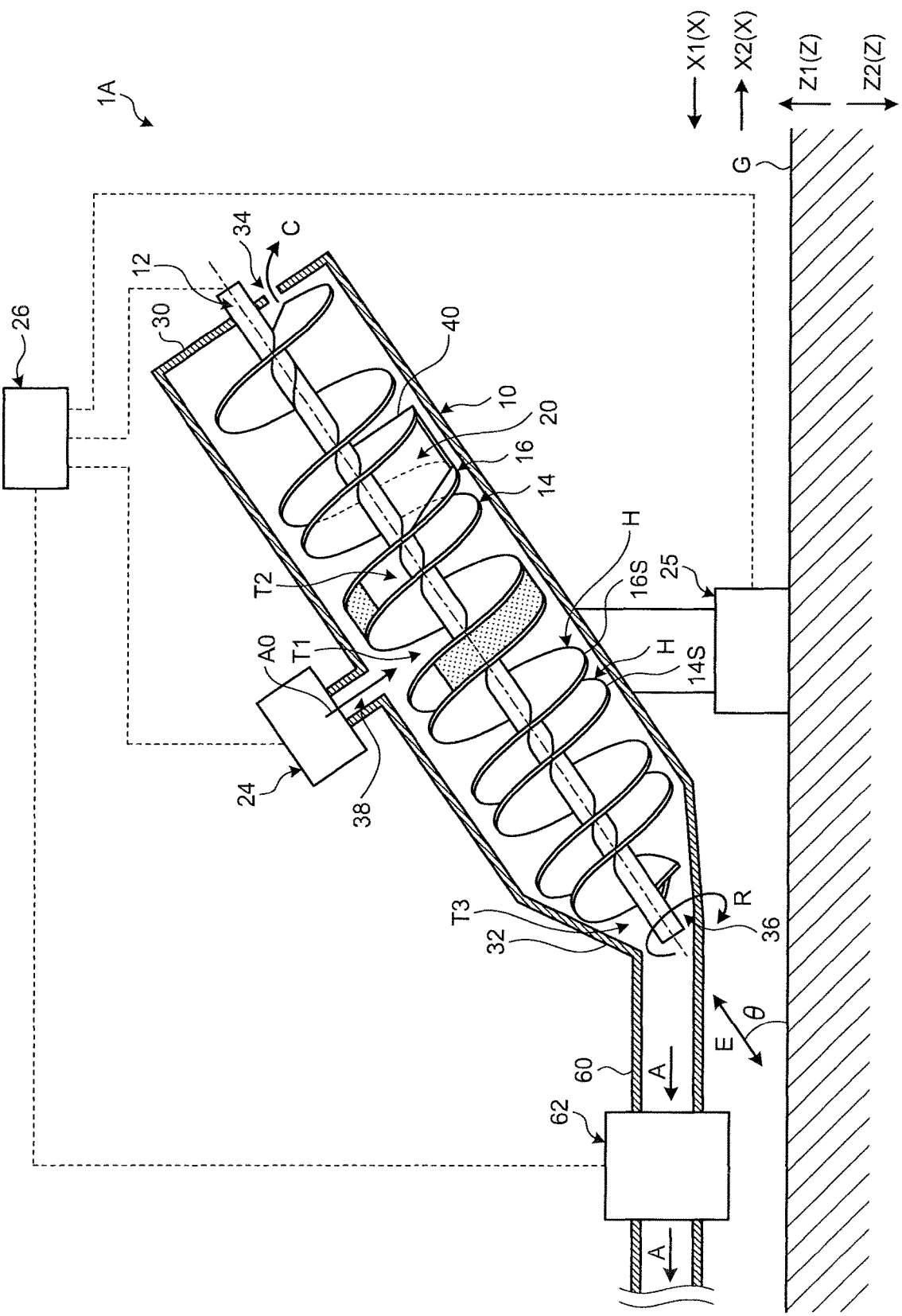
FIG. 5 is a partial cross-sectional view of a screw type separation device according to a second embodiment.

FIG. 5 is a partial cross-sectional view of the screw type separation device according to the second embodiment. As illustrated in FIG. 5, the screw type separation device 1A according to the second embodiment includes a discharge pipe 60 and the discharge pump 62. The discharge pipe 60 is a pipe connected to the object discharge port 36. To the discharge pipe 60, the object A from the object discharge port 36 is introduced. The discharge pump 62 is a pump provided for the discharge pipe 60. When being stopped, the discharge pump 62 blocks the pre-dehydration object (the preliminary object A0) that has moved to the other end part 32 of the casing 10. As a result, the preliminary object A0 and the separated liquid C are prevented from being discharged through the object discharge port 36 and thus accumulate in the casing 10. While being driven, the discharge pump 62 is able to forcibly discharge the post-dehydration object A in the casing 10 through the object discharge port 36, by sucking out the discharge pipe 60 from the object discharge port 36 side. Under the control of the controller 26, the discharge pump 62 is able to adjust the discharge amount of the object A in the casing 10. In other words, the discharge pump 62 functions as a discharge preventing unit.

Figure 6:
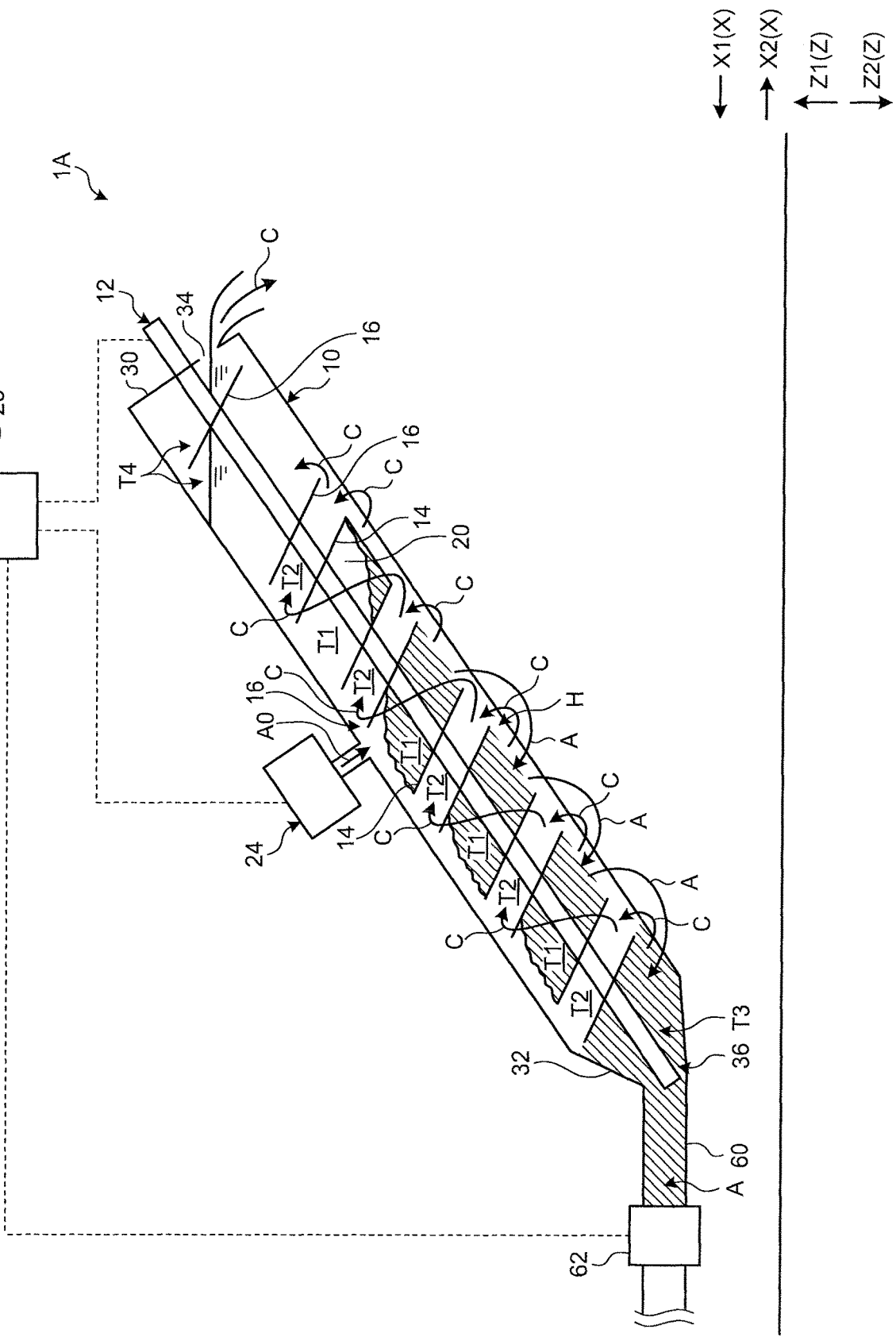
FIG. 6 is a schematic drawing for explaining an operation of the screw type separation device according to the second embodiment.
Figure 7:
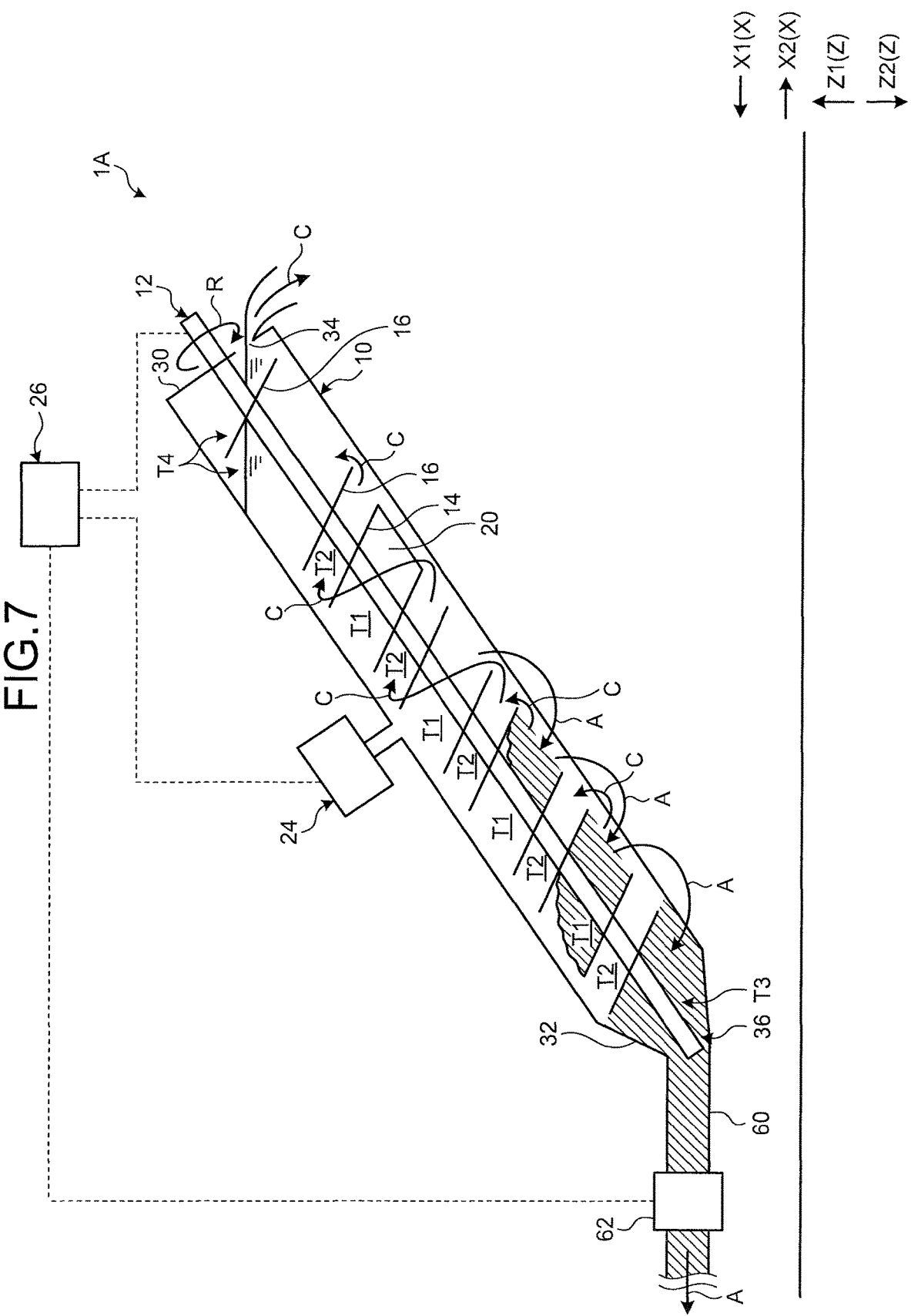
FIG. 7 is another schematic drawing for explaining the operation of the screw type separation device according to the second embodiment.

FIGS. 6 and 7 are schematic drawings for explaining an operation of the screw type separation device according to the second embodiment. FIG. 6 illustrates the object input process, similarly to FIG. 2 illustrating the first embodiment. As illustrated in FIG. 6, the controller 26 controls the input unit 24 so that the preliminary object A0 is input to the inside of the casing 10 through the object input port 38. The preliminary object A0 that has been input through the object input port 38 is input to the inside of the first space T1. Further, when inputting the preliminary object A0, the controller 26 stops the rotation of the screw shaft 12 and stops the driving of the discharge pump 62. In other words, while performing the object input process, the controller 26 also stops the discharging of the object A by the discharge pump 62. Accordingly, in the object input process according to the second embodiment illustrated in FIG. 6, the same process as the object input process illustrated in FIG. 2 in the first embodiment is performed, so that the dehydrated object A accumulates in the third space T3 and the first space T1.

FIG. 7 illustrates the object discharge process, similarly to FIG. 3 illustrating the first embodiment. As illustrated in FIG. 7, in the object discharge process, the controller 26 stops the input of the preliminary object A0 by the input unit 24 and discharges the object A in the casing 10 by the discharge pump 62. Accordingly, the post-dehydration object A in the third space T3 is discharged to the outside of the casing 10 through the object discharge port 36 and the discharge pipe 60. Further, the object A in the first space T1 moves to the inside of the third space T3 as a result of being sucked by the discharge pump 62. Accordingly, the object A in the casing 10 is forcibly discharged to the outside through the object discharge port 36. The controller 26 controls the discharge amount of the object A by controlling the driving of the discharge pump 62.

The object A is separated with the separated liquid C while moving being sucked by the discharge pump 62. Accordingly, the liquid level of the separated liquid C in the second space T2 continues to rise, and the separated liquid C continues to be discharged to the outside through the separated liquid discharge port 34.

The controller 26 according to the second embodiment does not rotate the screw shaft 12 during the object discharge process; however, the controller 26 may rotate the screw shaft 12 during the object discharge process, similarly to the first embodiment. As a result, the controller 26 becomes able to discharge the object A by using both the discharge pump 62 and the rotation of the screw shaft 12. Accordingly, even when the object A is sludge having high concentration, it is possible to discharge the object A more properly. Further, by rotating the screw shaft 12, it is also possible to improve the separation efficiency in a more suitable manner, similarly to the first embodiment.

Figure 8:
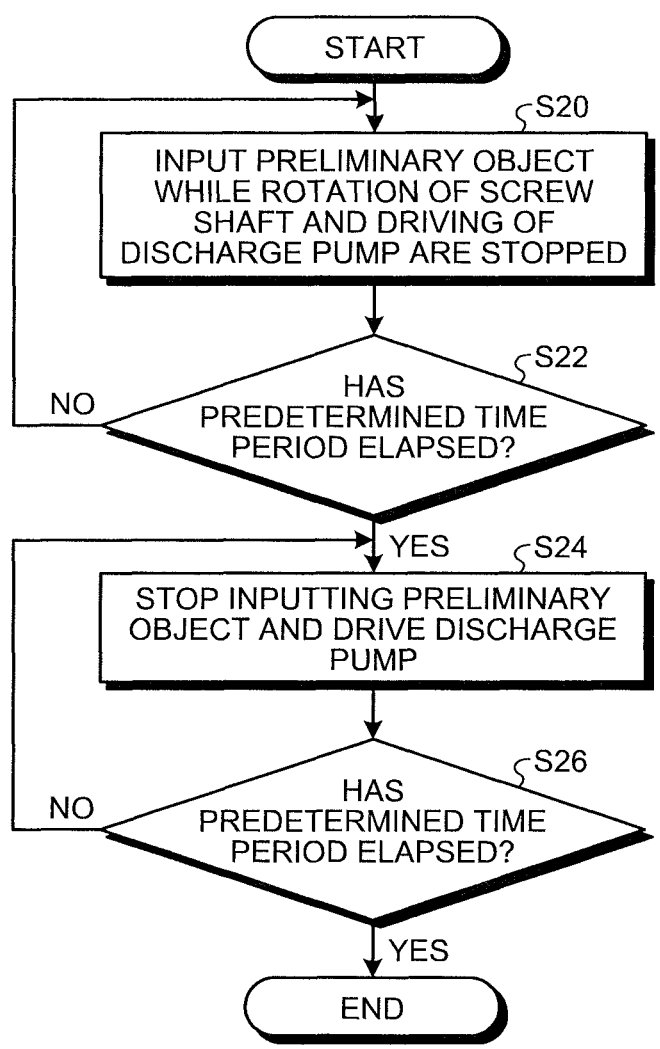
FIG. 8 is a flowchart for explaining a flow in a dehydrating process performed on a preliminary object according to the second embodiment.

A flow in the dehydrating process performed on the preliminary object A0 by the controller 26 described above will be explained on the basis of a flowchart. FIG. 8 is a flowchart for explaining the flow in the dehydrating process performed on the preliminary object according to the second embodiment. As illustrated in FIG. 8, the controller 26 at first inputs the preliminary object A0 to the inside of the casing 10, while stopping the rotation of the screw shaft 12 and the driving of the discharge pump 62 (step S20). This process is the same as the process at step S10 in the first embodiment (FIG. 4), except that the driving of the discharge pump 62 is stopped, i.e., the discharging of the object A by the discharge pump 62 is stopped. The controller 26 continues to input the preliminary object A0 while stopping the rotation of the screw shaft 12 and the driving of the discharge pump 62, and judges whether or not the predetermined time period D1 has elapsed since the process was started (step S22). When the controller 26 determines that the predetermined time period D1 has not elapsed (step S22: No), the process returns to step S20, and the controller 26 continues the object input process. When determining that the predetermined time period D1 has elapsed (step S22: Yes), the controller 26 stops inputting the preliminary object A0 and drives the discharge pump 62 (step S24). In other words, the controller 26 performs the object discharge process to discharge the separated liquid C through the separated liquid discharge port 34, while discharging the object A by using the discharge pump 62. In this situation, the controller 26 at first stops inputting the preliminary object A0, and when a predetermined time period has elapsed, the controller 26 drives the discharge pump 62. Accordingly, the controller 26 is able to start the discharge by the discharge pump 62 after the preliminary object A0 has settled down. During the object discharge process, the controller 26 may rotate the screw shaft 12 in the same manner as in the first embodiment, while discharging the object A by using the discharge pump 62.

The controller 26 continues to perform the process of driving the discharge pump 62 while the input of the preliminary object A0 is stopped, and judges whether or not the predetermined time period D2 has elapsed since the process was started (step S26). When the controller 26 determines that the predetermined time period D2 has not elapsed (step S26: No), the process returns to step S24 and the controller 26 continues the object discharge process. When the controller 26 determines that the predetermined time period D2 has elapsed (step S26: Yes), the process is finished, but the process may return to step S20 so as to resume the object input process. When the object input process is resumed, the controller 26 starts inputting the preliminary object A0 after stopping the driving of the discharge pump 62.

The controller 26 does not necessarily have to switch between the object input process and the object discharge process. In that situation, the controller 26 drives the discharge pump 62, while inputting the object A to the inside of the casing 10. The process of driving the discharge pump 62 while inputting the object A to the inside of the casing 10 is a process of continuing to input the preliminary object A0 to the inside the first space T1 in the object discharge process illustrated in FIG. 7. In that situation, the preliminary object A0 is dehydrated while moving toward the other end part 32 side due to gravity and the suction of the discharge pump 62 and is separated into the object A and the separated liquid C. By the suction of the discharge pump 62, the object A is discharged to the outside. Further, the separated liquid C accumulates within the second space T2 and is discharged through the separated liquid discharge port 34. When the discharge pump 62 is driven while the preliminary object A0 is being input in this manner, it is preferable to provide the cover part 18. Also, in that situation, it is preferable when the controller 26 arranges the discharge amount of the object A to be smaller than the input amount of the preliminary object A0.

As explained above, the screw type separation device 1A according to the present embodiment includes the discharge pump 62 as a discharge preventing unit. The discharge pump 62 is connected to the object discharge port 36 of the casing 10, blocks the pre-dehydration object (the preliminary object A0) that has moved to the other end part 32 of the casing 10, and forcibly discharges the post-dehydration object A through the object discharge port 36. By blocking the discharge of the preliminary object A0 by the discharge pump 62, the screw type separation device 1 configured in this manner prevents the preliminary object A0 and the separated liquid C from being discharged through the object discharge port 36 in a more suitable manner and stabilizes the flow speed of the preliminary object A0 in the casing 10. Further, by discharging the post-dehydration object A by using the discharge pump 62, it is possible to easily manage the time and the volume of the discharge of the object A and to make the control easy. Further, by discharging the post-dehydration object A by the discharge pump 62, it is possible to easily convey the object A to the next step (e.g., a dehydrator).

Third Embodiment

Next, a third embodiment will be explained. A screw type separation device 1B according to the third embodiment is different from the device in the first embodiment for including a separated liquid discharge pump 66. The explanations of elements of the third embodiment having the same configurations as those in the first embodiment will be omitted.

Figure 9:
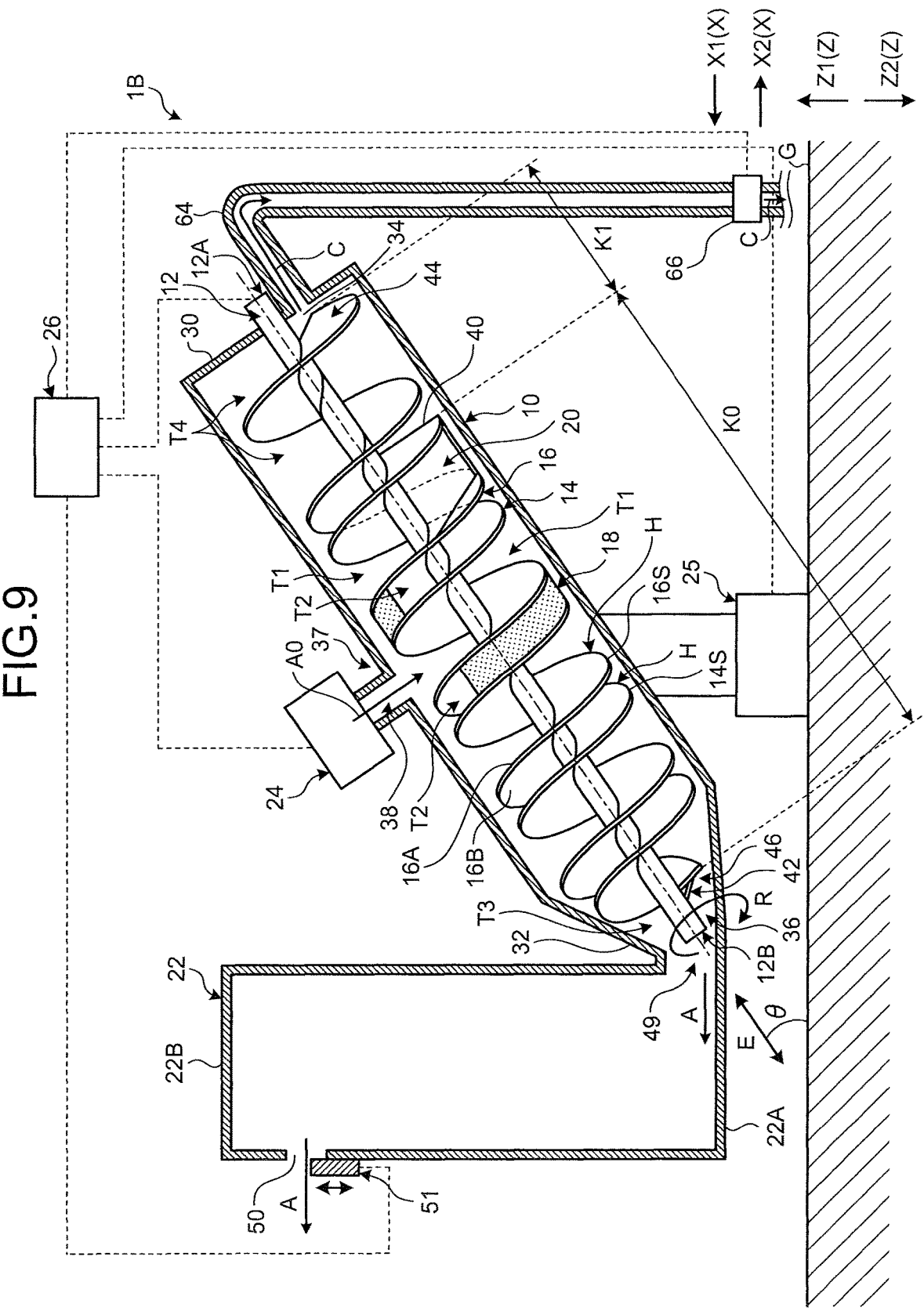
FIG. 9 is a partial cross-sectional view of a screw type separation device according to a third embodiment.

FIG. 9 is a partial cross-sectional view of a screw type separation device according to the third embodiment. As illustrated in FIG. 9, the screw type separation device 1B according to the third embodiment includes a discharge pipe 64 and the separated liquid discharge pump 66. The discharge pipe 64 is a pipe which is connected to the separated liquid discharge port 34 and to which the separated liquid C in the casing 10 is introduced. The separated liquid discharge pump 66 is a pump provided for the discharge pipe 64 and is connected to the separated liquid discharge port 34 via the discharge pipe 64. The discharge pipe 64 extends from the separated liquid discharge port 34 toward the Z2 direction side, and extends toward the Z2 direction side of the bottom face part 22A of the flow volume adjusting tank 22. The separated liquid discharge pump 66 is connected to a part of the discharge pipe 64 that is positioned on the Z2 direction side with respect to the bottom face part 22A of the flow volume adjusting tank 22. Accordingly, the separated liquid discharge pump 66 is positioned on the Z2 direction side with respect to the bottom face part 22A of the flow volume adjusting tank 22.

The separated liquid discharge pump 66 is driven by the controller 26, so that the separated liquid discharge pump 66 sucks the separated liquid C in the casing 10 and forcibly discharges the separated liquid C in the casing 10 to the outside through the discharge pipe 64. When the driving of the separated liquid discharge pump 66 is stopped by the controller 26 such that the separated liquid discharge pump 66 stops the discharging of the separated liquid C from the inside of the casing 10. In other words, when the separated liquid discharge pump 66 is stopped, the separated liquid C remains in the casing 10. Under the control of the controller 26, the separated liquid discharge pump 66 is able to adjust the discharge amount of the separated liquid C in the casing 10.

The controller 26 continually operates the separated liquid discharge pump 66. In other words, the controller 26 drives the separated liquid discharge pump 66 while rotating the screw shaft 12. Accordingly, while the separated liquid C is discharged by the separated liquid discharge pump 66, the object A is discharged through the flow volume adjustment discharge port 50. However, the controller 26 may cause the separated liquid discharge pump 66 to operate intermittently or may drive the separated liquid discharge pump 66 after stopping the screw shaft 12.

When a flocculating agent has been added to the preliminary object A0, the preliminary object A0 is in a flocculated state. In that situation, when the object A that has been dehydrated by the screw type separation device 1B is discharged, there is a possibility that the flocculation of the object A may be broken. If the flocculation is broken, there is a possibility that the effect of the injected flocculating agent may not be maintained properly. In the present embodiment, the discharge amount of the separated liquid C is controlled by using the separated liquid discharge pump 66. In a case where the separated liquid C is discharged, the object A is also discharged through the flow volume adjustment discharge port 50 in conjunction therewith. In that situation, because the discharge amount of the object A is not directly controlled, the object A will not forcibly be discharged but will be discharged in a natural flow. It is therefore possible to prevent the flocculation of the discharged object A from being broken. In this manner, according to the present embodiment, because the discharge amount of the separated liquid C is controlled by the separated liquid discharge pump 66, it is possible to control the discharge amount and the concentration rate of the object A while preventing the flocculation of the object A from being broken. In the present embodiment also, however, the preliminary object A0 does not necessarily have to have a flocculating agent added thereto. In that situation also, the screw type separation device 1B is able to properly control the discharge amount and the concentration rate of the object A.

As explained above, the screw type separation device 1B according to the third embodiment includes the separated liquid discharge pump 66. The separated liquid discharge pump 66 is connected to the separated liquid discharge port 34 and forcibly discharges the separated liquid C in the casing 10. By discharging the separated liquid C in the casing 10 by the separated liquid discharge pump 66, the screw type separation device 1B is able to control the discharge amount and the concentration rate of the object A while preventing the flocculation of the object A from being broken. The separated liquid discharge pump 66 may be provided for the screw type separation device 1A according to the second embodiment. In other words, the separated liquid discharge pump 66 may be provided together with the discharge pump 62.

First Example

Figure 10:
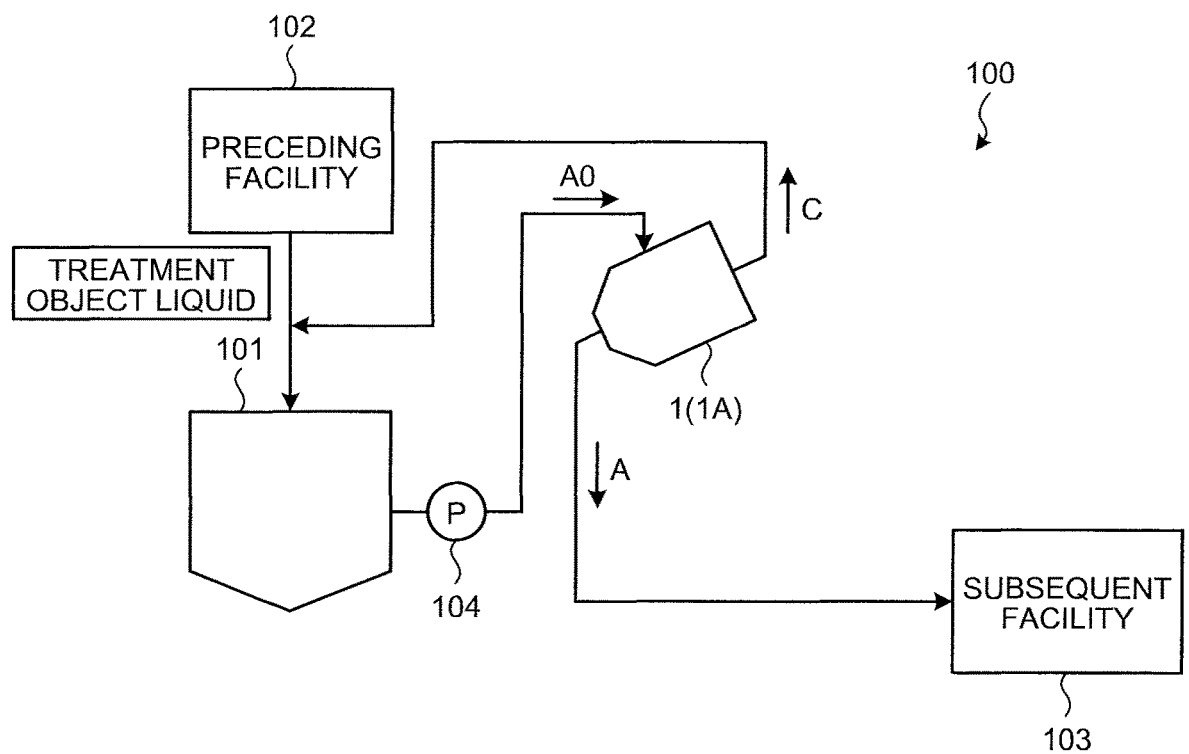
FIG. 10 is a diagram illustrating a part of a wastewater treatment system in a first example.

Next, a wastewater treatment system serving as a first example including the screw type separation device 1 or 1A described above will be explained. FIG. 10 is a diagram illustrating a part of the wastewater treatment system in the first example.

As illustrated in FIG. 10, a wastewater treatment system 100 in the first example includes a sedimentation basin 101, a preceding facility 102 provided at a stage preceding the sedimentation basin 101, a subsequent facility 103 provided at a stage subsequent to the sedimentation basin 101, a withdrawal pump 104, and the screw type separation device 1 (or 1A). The sedimentation basin 101 is a solid-liquid separation tank used for separating, by sedimentation, treatment object liquid supplied from the preceding facility 102 into separated liquid and sludge. The preceding facility 102 is a facility that is configured so as to include various types of treatment tanks such as a reaction tank and that treats organic wastewater such as sewage, for example. The subsequent facility 103 is a facility that includes, for example, an incinerator or the like and that performs an incineration process and a disposal process on the sludge (concentrated sludge) discharged from the screw type separation device 1. The withdrawal pump 104 is a sludge withdrawing means for withdrawing sludge from the sedimentation basin 101 and supplying the sludge to the screw type separation device 1. The screw type separation device 1 is provided in a higher position (in the direction away from the ground surface) than the sedimentation basin 101, in terms of the vertical directions.

In the wastewater treatment system 100, at least a part of the treatment object liquid discharged from the preceding facility 102 is supplied to the sedimentation basin 101. In the sedimentation basin 101, the supplied treatment object liquid is separated, by sedimentation, into the separated liquid and the sludge. Further, the separated sludge is withdrawn by the withdrawal pump 104 from a bottom part of the sedimentation basin 101 and is supplied to the screw type separation device 1. The withdrawn sludge is conveyed to the inside of the screw type separation device 1 through the object input port 38 (see FIG. 1) as the preliminary object A0.

In the screw type separation device 1, the separated liquid C is separated in the same manner as in the embodiments described above. The separated liquid C that has been separated is returned to the sedimentation basin 101. The object A that has been separated (that has been dehydrated) is conveyed to the subsequent facility 103 as concentrated sludge so that the incineration process and the disposal process are performed thereon. In the manner described above, the wastewater treatment in the first example is performed.

In the first example described above, by using the screw type separation device 1 according to the embodiments described above, the preliminary object A0 withdrawn from the sedimentation basin 101 is concentrated, so that the separated liquid C is returned to the sedimentation basin 101. As a result, it is possible to improve the concentration density level of the object A and to significantly enhance the maintainability and manageability of the sedimentation basin 101. In other words, the sedimentation basin 101 often has intermediate liquid. In a case where such intermediate liquid is present, at the time of withdrawing the sludge (the preliminary object A0), the liquid is withdrawn with a higher priority than the sludge (the preliminary object A0) is. Thus, a problem may arise where the concentration density level would not increase even when the sludge (the preliminary object A0) is compressed. To cope with this problem, in the first example described above, because the screw type separation device 1 is provided at the stage subsequent to the sedimentation basin 101, it is possible to separate only the intermediate liquid from the withdrawn sludge (the preliminary object A0) and to return the separated intermediate liquid to the sedimentation basin 101. It is therefore possible to improve the concentration density level of the sludge (the preliminary object A0). Accordingly, even when the sedimentation basin 101 contains intermediate liquid like in conventional examples, it is possible to improve the concentration density level of the sludge (the preliminary object A0). In addition, because it is possible to manufacture the screw type separation device 1 at a low cost, it is also possible to realize the wastewater treatment system 100 at a low cost. Further, even when the sludge (the preliminary object A0) causes clogging within the casing 10, it is possible to easily remove the clogging by rotating the screw shaft 12 in the direction opposite to the direction R.

First Modification Example of First Example

Figure 11:
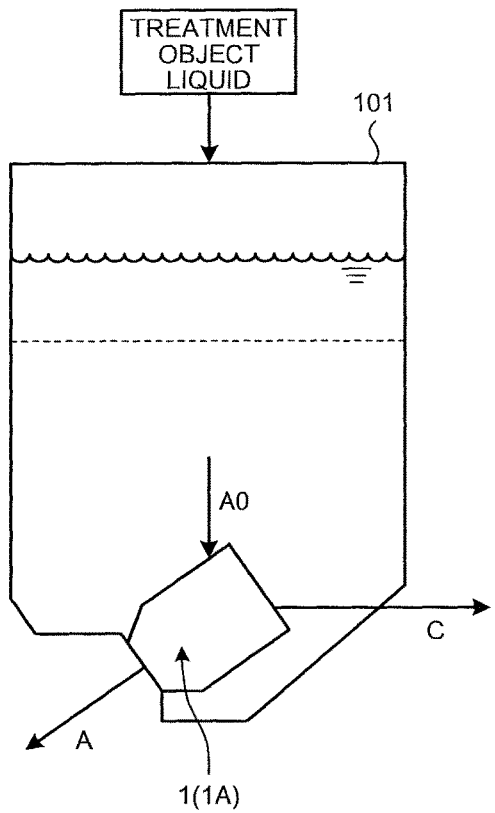
FIG. 11 is a schematic diagram illustrating a sedimentation basin for explaining a modification example of the first example.

Next, modification examples of the first example described above will be explained. FIG. 11 is a schematic diagram illustrating a sedimentation basin for explaining a modification example of the first example. As illustrated in FIG. 11, in a first modification example, the screw type separation device 1 according to any one of the embodiments is provided in a lower part of the sedimentation basin 101. Further, the sludge that has settled down in the lower part of the sedimentation basin 101 is supplied, as the preliminary object A0, to the inside of the screw type separation device 1 through the object input port 38 (see FIG. 1) by using a sludge collecting device such as a funnel (not illustrated). The screw type separation device 1 discharges the concentrated sludge (the object A) to the outside and returns separated liquid C that has been separated, to the inside of the sedimentation basin 101 through a pipe or the like (not illustrated) via an internal or external route. It is also acceptable to discharge the separated liquid C to the outside. The other configurations are the same as those described in the first example.

Second Modification Example of First Example

Further, in a second modification example, when a gravitational sedimentation tank such as the sedimentation basin 101 is provided at a stage preceding the screw type separation device 1, it is also possible to provide, in the sedimentation basin 101, a picket fence (not illustrated) configured with bar-like members standing upright on the top side of a rake used for raking and collecting the sludge. By providing the picket fence, it is possible to accelerate the sedimentation of the sludge in the sedimentation basin 101 and is thus able to accelerate so-called flocculation. Accordingly, it is possible to make even more efficient the process of separating the object A and the separated liquid C from each other that is performed by the screw type separation device 1. It is therefore possible to significantly improve the solid-liquid separability.

Second Example

Figure 12:
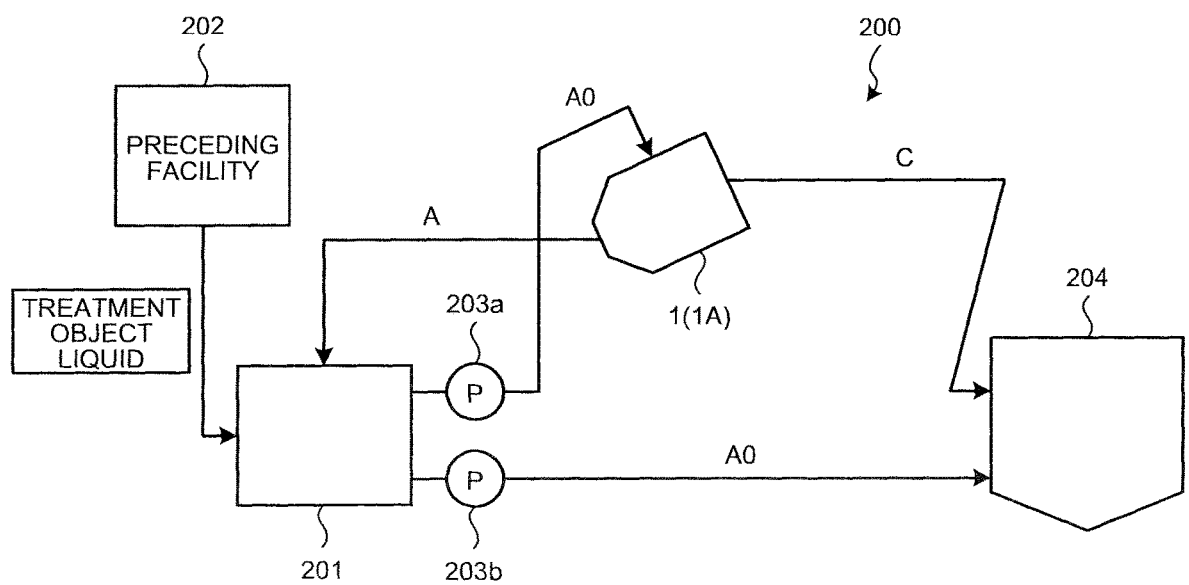
FIG. 12 is a diagram illustrating a part of a wastewater treatment system in a second example.

Next, a wastewater treatment system serving as a second example including the screw type separation device 1 according to any one of the embodiments described above will be explained. FIG. 12 is a diagram illustrating a part of the wastewater treatment system in the second example.

As illustrated in FIG. 12, a wastewater treatment system 200 in the second example includes a reaction tank 201, a preceding facility 202 provided at a stage preceding the reaction tank 201, a sedimentation basin 204 provided at a stage subsequent to the reaction tank 201, withdrawal pumps 203a and 203b, and the screw type separation device 1. The screw type separation device 1 is provided in a higher position (in the direction away from the ground surface) than the reaction tank 201 and the sedimentation basin 204 in terms of the vertical directions.

The reaction tank 201 is structured with a plurality of bioreactor tanks, for example. The bioreactor tanks structuring the reaction tank 201 are various types of bioreactor tanks such as an anaerobic tank, an anoxic tank, and an aerobic tank, or the like. The preceding facility 202 is a facility that is configured to include a grit chamber or a tilt-board sedimentation basin and that treats organic wastewater such as sewage, for example. The withdrawal pump 203a is a sludge withdrawing means for withdrawing sludge such as activated sludge from the reaction tank 201 and supplying the withdrawn sludge to the screw type separation device 1 as the preliminary object A0. Similarly, the withdrawal pump 203b is a sludge withdrawing means for withdrawing sludge from the reaction tank 201 and supplying the withdrawn sludge to the sedimentation basin 204 provided at the subsequent stage. The sedimentation basin 204 is a solid-liquid separation tank used for separating, by sedimentation, treatment object liquid and separated liquid C supplied from the reaction tank 201 and from the screw type separation device 1, respectively, into separated liquid C and sludge (the object A).

In the wastewater treatment system 200 in the second example, at least a part of the treatment object liquid discharged from the preceding facility 202 is supplied to the reaction tank 201. In the reaction tank 201, a bioprocess such as nitrification treatment and/or denitrification treatment is applied to the treatment object liquid. The activated sludge in the reaction tank 201 is withdrawn by the withdrawal pumps 203a and 203b. The sludge withdrawn by the withdrawal pump 203a is supplied to the screw type separation device 1 as the preliminary object A0 and is conveyed to the inside thereof through the object input port 38 (see FIG. 1).

In the screw type separation device 1, the conveyed sludge (the preliminary object A0) is concentrated, so that separated liquid C is separated. The separated liquid C that has been separated is supplied to the sedimentation basin 204 provided at the subsequent stage. The sludge and the treatment object liquid withdrawn from the reaction tank 201 by the withdrawal pump 203b are supplied to the sedimentation basin 204. In the sedimentation basin 204, a solid-liquid separating process using gravitational sedimentation is performed in the same manner as in the first example. In this manner, the wastewater treatment in the second example is performed.

In the second example described above, by using the screw type separation device 1, the sludge (the preliminary object A0) is withdrawn from the reaction tank 201 and compressed and concentrated. The compressed and concentrated sludge (the object A) is returned to the reaction tank 201, and also, the separated liquid C is supplied to the sedimentation basin 204 serving as the solid-liquid separation tank. With these arrangements, it is possible to solve the following problems.

Conventionally, an extremely large amount of electric power is used for operating a return pump (not illustrated) used for returning the sludge (the object A) from the sedimentation basin 204 to the reaction tank 201. In contrast, in the second example, it is possible to return the sludge (the object A) compressed and concentrated by the screw type separation device 1 to the reaction tank 201. It is therefore possible to significantly reduce the electric power required by the returning of the sludge (the object A). Further, by using the screw type separation device 1, it is possible to sufficiently perform the process of separating solid and liquid from each other. Consequently, because it is possible to lower the frequency with which the sludge is withdrawn from the sedimentation basin 204, it is possible to reduce the electric power used in the wastewater treatment system 200 and to thus save energy.

Conventionally, providing a separation membrane in the reaction tank 201 leads to a problem where burdens related to an initial cost and maintenance of facilities are large. In contrast, because it is possible to introduce the screw type separation device 1 having a lower cost in place of the separation membrane, it is possible to lower the initial cost. Further, because it is possible to easily maintain and manage the screw type separation device 1, the burdens related to the maintenance are reduced, and it is therefore possible to reduce the maintenance costs.

Further, in the second example, it is possible to have a large Mixed Liquor Suspended Solids (MLSS) value in the reaction tank 201. It is therefore possible to reduce loads imposed on the sedimentation basin 204 and to reduce the electric power consumed by the withdrawal pumps 203a and 203b used for withdrawing the sludge from the reaction tank 201. Accordingly, it is possible to save energy in the wastewater treatment system 200.

Further, in the examples, the sludge (the preliminary object A0) input to the screw type separation device 1 does not have any flocculating agent added thereto and thus contains no flocculating agent. In other words, the sludge in the sedimentation basin 101 has no flocculating agent added thereto, and the sludge in the reaction tank 201 has no flocculating agent added thereto, either. Because the screw type separation device 1 configured in this manner performs the separating process using gravity, it is possible to prevent the separation efficiency from decreasing, even when the sludge contains no flocculating agent. As mentioned above, however, the sludge (the preliminary object A0) may contain a flocculating agent added thereto.

Certain embodiments of the present invention have thus been explained; however, the present invention is not limited to the embodiments described above and may be modified in various manners based on the technical concept of the present invention. Further, the constituent elements described above include those that can easily be conceived of by a person skilled in the art, those that are substantially the same, and those that are in a so-called equivalent scope. Further, it is also possible to combine, as appropriate, any of the constituent elements described above. Furthermore, the constituent elements may be omitted, substituted, or changed in various manners, as long as doing so does not depart from the gist of the embodiments described above. For example, the numerical values used in the embodiments above are merely examples, and it is acceptable to use different numerical values as necessary.

In the embodiments described above, the screw shaft 12 is configured with the shaft having a circular columnar shape; however, possible shapes are not necessarily limited to this example. For instance, the screw shaft 12 may be formed to have an increasing diameter so that the diameter gradually increases from the one end part 30 toward the other end part 32 side of the casing 10.

In the embodiments described above, the solid-liquid separation device that separates the sludge into the solid component and the moisture is explained as an example; however, the present disclosure is not necessarily limited to the solid-liquid separation of sludge and is applicable to various methods for separating solid and liquid from each other.

In the embodiments described above, the separated liquid discharge port 34 may be configured so that the position thereof can be changed to various locations.

In the embodiments described above, the moving of the separated liquid C from the first space T1 to the second space T2 is realized through the gap H; however, possible embodiments are not necessarily limited to the configuration using the gap H. For example, another configuration is also acceptable in which a filtering means being in a mesh form or having a large number of small pores is additionally provided in at least a part of the first screw blade 14 and/or the second screw blade 16, so that it is possible to move the separated liquid C from the first space T1 to the second space T2.

Further, the screw type separation device 1 according to any of the embodiments described above may also be used as a preliminary concentrator for a dehydrator, a private-use simple concentrator, a confluence improvement screen, or the like.

In the first example of any of the embodiments described above, the sludge withdrawn by the withdrawal pump 104 is the sludge that has settled down in the sedimentation basin 101; however, the sludge to be withdrawn does not necessarily have to be the sludge that has settled down. For example, floating sludge easily occurs in the sedimentation basin 101 in the summer. It is therefore possible to withdraw such floating sludge by using the withdrawal pump 104 and to supply the withdrawn sludge to the screw type separation device 1.

In the first example described above, the example is explained in which the screw type separation device 1 according to any of the embodiments is combined with the sedimentation basin 101; however, possible examples are not necessarily limited to this mode. More specifically, for instance, it is also possible to combine a filter concentration device with the screw type separation device 1. In that situation, it is possible to install the screw type separation device 1 described above on a line of the filter concentration device used for withdrawing the sludge or in a bottom part of the filter concentration device. In this situation, because the filter concentration device operates intermittently, concentrated sludge is temporarily stored in the filter concentration device, so that the sludge is withdrawn from a lower part. For this reason, supernatant liquid retained above the sludge during the temporarily retention is withdrawn together with the concentrated sludge. As a result, although the same problem as that of the first example above is present, by using the screw type separation device 1 according to any of the embodiments, it is possible to separate the supernatant liquid (the supernatant water) at the time of withdrawing the sludge. It is therefore possible to stably keep the concentration density level of the concentrated sludge at a high level.

Certain embodiments, examples, and modification examples of the present invention have thus been explained; however, possible embodiments are not limited to the description of the embodiments and the like. Further, the constituent elements described above include those that can easily be conceived of by a person skilled in the art, those that are substantially the same, and those that are in a so-called equivalent scope. Further, it is also possible to combine, as appropriate, any of the constituent elements described above. Furthermore, the constituent elements may be omitted, substituted, or changed in various manners, as long as doing so does not depart from the gist of the embodiments and the like described above.

REFERENCE SIGNS LIST

1 SCREW TYPE SEPARATION DEVICE
10 CASING
12 SCREW SHAFT
14 FIRST SCREW BLADE
16 SECOND SCREW BLADE
16A ONE FACE
16B OTHER FACE
18 COVER PART
20 PARTITION WALL PART
22 FLOW VOLUME ADJUSTING TANK
24 INPUT UNIT
25 SLOPE ADJUSTING UNIT
26 CONTROLLER
30 ONE END PART
32 OTHER END PART
34 SEPARATED LIQUID DISCHARGE PORT
36 OBJECT DISCHARGE PORT
37 INTERMEDIATE PART
38 OBJECT INPUT PORT
T1 FIRST SPACE
T2 SECOND SPACE

The invention claimed is:
1. A screw type separation device comprising:
a casing that has an object input port into which an object is input and has, a separated liquid discharge port used for discharging separated liquid that has been separated from the object and has, an object discharge port used for discharging the object that has been dehydrated;

a screw shaft provided inside the casing;
a first screw blade spirally extending on an outer circumferential surface of the screw shaft;
a second screw blade that spirally extends on the outer circumferential surface of the screw shaft and is positioned to face the first screw blade at a predetermined interval therebetween;
a slope setting unit, which supports the casing, that sets an axial extending direction of the casing to be inclined or perpendicular to the horizontal plane, and
a discharge preventing unit that is connected to the object discharge port and blocks the object prior to the dehydration from being discharged through the object discharge port:
wherein the casing has the separated liquid discharge port at one end of the casing, which is along the rotational direction of the screw shaft with respect to the object input port, and the object discharge port at another end of the casing, which is along the rotational direction of the screw shaft with respect to the object input port, such that an axial extending direction of the casing is inclined or perpendicular to the horizontal plane, and the separated liquid discharge port is disposed at a position that is higher than the position of the object input port and the object discharge port is disposed at a position that is lower than a position of the object input port in terms of a vertical direction, and
wherein the discharge preventing unit is connected to the object discharge port of the casing and has a flow volume adjustment discharge port provided in a higher position, in terms of the vertical directions, than the object discharge port.

2. The screw type separation device according to claim 1, wherein the predetermined interval is formed by faces of the first screw blade and faces of the second screw blade facing each other.

3. The screw type separation device according to claim 1, further comprising: a controller that controls rotation of the screw shaft, wherein
the controller discharges the object by rotating the screw shaft.

4. The screw type separation device according to claim 1, further comprising:
a controller that controls rotation of the screw shaft, wherein
the controller dehydrates the object by switching between a rotating state and a stopped state of the screw shaft.

5. The screw type separation device according to claim 1, comprising: a partition wall part that is provided for the first space and blocks the object from entering a space positioned at the one end of the casing with respect to an installation position of the partition wall part.

6. The screw type separation device according to claim 1, wherein
the second screw blade is configured so that a second screw blade end part is positioned at the one end of the casing with respect to a first screw blade end part, and
a section from the first screw blade end part to the second screw blade end part is a single screw section in which the second screw blade is provided, but the first screw blade is not provided.

7. The screw type separation device according to claim 6, wherein the second screw blade is shaped to be a ribbon screw blade shape denoting a shape in which an opening is provided in a region positioned between an outer circumferential part of the second screw blade and the screw shaft at the one end of the casing with respect to the first screw blade end part.

8. A wastewater treatment system comprising: a solid-liquid separation tank that separates sludge from organic wastewater; and the screw type separation device according to claim 1, wherein
the screw type separation device is configured to be able to concentrate the sludge discharged from the solid-liquid separation tank and to return the separated liquid occurring at a time of concentrating the sludge to the solid-liquid separation tank.

9. The wastewater treatment system according to claim 8, wherein the screw type separation device is provided within the solid-liquid separation tank.

10. A wastewater treatment system comprising: a reaction tank that performs a bioprocess on organic wastewater; a solid-liquid separation tank that separates sludge from the organic wastewater; and the screw type separation device according to claim 1, wherein
the screw type separation device is configured to be able to withdraw and concentrate sludge serving as the object from the reaction tank, to return the concentrated sludge to the reaction tank, and to supply the separated liquid occurring at a time of concentrating the sludge to the solid-liquid separation tank.

11. The wastewater treatment system according to claim 8, wherein the sludge input to the screw type separation device contains no flocculating agent.

12. The screw type separation device according to claim 1, wherein the slope setting unit adjusts a slope angle of the casing.

13. The screw type separation device according to claim 1, wherein the slope setting unit is attached to the casing.

14. A screw type separation device comprising:
a casing that has an object input port into which an obje is input and has, a separated liquid discharge port used for discharge separated liquid that has been separated from the object and has, an object discharge port used for discharging the object that has been dehydrate;
a screw shaft provided inside the casing:
a first screw blade s endin on an outer circumferential surface of the screw shalt;
a second screw blade that spirally extends on the outer circumferential surface of the screw shaft and is positioned to face the first screw blade at a predetermined interval therebetween:
slope setting unit, which supports the casing, that sets an axial extending direction of the casing to be inclined or perpendicular to the horizontal plane, and
the discharge preventing unit that is connected to the object discharge port and blocks objects prior to the dehydration from being discharged through the object discharge port,
wherein the casing has the seperated liquid discharge port at one end of the casing, which is along the rotational direction of the screw shaft with respect to the object input port, and the object discharge port at another end of the casing, which is along the rotational direction of the screw shaft with respect to the object input port, such that an axial extending direction of the casing is inclined or perpendicular to the horizontal plane, and the seperate liquid discharge port is disposed at a position that is higher than the position of the object input port and the object discharge port is disposed at a position that is lower than a position of the object input poort in terms of a vertical direction, and wherein the discharge preventing unit includes a discharge pump that is connected to the object discharge port, blocks the object prior to the dehydration that has moved to the other end of the casing, and forcibly discharges the object dehydrated through the object discharge port.

15. A screw type separation device comprising:

a casing that has an object input port into which an object is input and has, a separated liquid discharge port s d for discharging separated liquid that has been separated from the object and has, an abject discharge port used for discharging the object that has been dehydrated:

a screw shaft provided inside the casing;

a first screw blade spirally extending on an outer circumferential surface of the screw shaft;

a second screw blade spirally that spirally extends on an outer circumferential surface of the screw shaft and is positioned to face the first screw blade at a predetermined interval therebetween;

a slope setting unit, which supports the casing, that sets an axial extending direction of the casing to be inclined or perpendicular to the horizontal plane, and a separated liquid discharge pump that is connected to the separated liquid discharge port and that forcibly discharges the separated liquid in the casing, wherein the casing has the separated liquid discharge port at one end of the casing, which is along the rotational direction of the screw shaft with respect to the object input port, and the object discharge port at another end of the casing, which is along the rotational direction of the screw shaft with respect to the object input port, such that an axial extending direction of the easing is inclined or perpendicular to the horizontal plane, and the separated liquid discharge port is disposed at a position that is higher than the position of the object input port and the object discharge port is disposed at a position that is lower than a position of the object input port in terms of a vertical direction.

\* \* \* \* \*